(12) United States Patent
Itsumi et al.

(10) Patent No.: US 9,046,728 B2
(45) Date of Patent: Jun. 2, 2015

(54) LIQUID CRYSTAL DISPLAY DEVICE

(75) Inventors: Ikumi Itsumi, Osaka (JP); Mitsuaki Hirata, Osaka (JP); Masae Kitayama, Osaka (JP); Kenichi Hyohdoh, Osaka (JP); Yuki Yamashita, Osaka (JP); Akane Sugisaka, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 243 days.

(21) Appl. No.: 13/520,845

(22) PCT Filed: Oct. 26, 2010

(86) PCT No.: PCT/JP2010/069001
§ 371 (c)(1),
(2), (4) Date: Jul. 6, 2012

(87) PCT Pub. No.: WO2011/092913
PCT Pub. Date: Aug. 4, 2011

(65) Prior Publication Data
US 2012/0326954 A1      Dec. 27, 2012

(30) Foreign Application Priority Data
Jan. 29, 2010   (JP) .................................. 2010-019562

(51) Int. Cl.
*G09G 3/36*      (2006.01)
*G02F 1/1368*    (2006.01)

(52) U.S. Cl.
CPC .......... *G02F 1/1368* (2013.01); *G02F 2201/52* (2013.01); *G09G 3/3607* (2013.01); *G09G 3/3648* (2013.01); *G09G 2300/0452* (2013.01); *G09G 2300/0876* (2013.01)

(58) Field of Classification Search
CPC .. G02F 1/1368; G09G 3/3648; G09G 3/3607; G09G 2300/0452; G09G 2300/0876; G02F 2201/52
USPC .............. 345/88, 92; 349/38–39, 42–43, 106, 349/146
See application file for complete search history.

(56) References Cited

U.S. PATENT DOCUMENTS

| | | |
|---|---|---|
| 5,402,141 A | 3/1995 | Haim et al. |
| 2001/0003446 A1* | 6/2001 | Takafuji .......................... 345/98 |

(Continued)

FOREIGN PATENT DOCUMENTS

| | | |
|---|---|---|
| JP | 06-011733 A | 1/1994 |
| JP | 09-113933 A | 5/1997 |

(Continued)

OTHER PUBLICATIONS

Official Communication issued in International Patent Application No. PCT/JP2010/069001, mailed on Nov. 30, 2010.

*Primary Examiner* — Amare Mengistu
*Assistant Examiner* — Stacy Khoo
(74) *Attorney, Agent, or Firm* — Keating & Bennett, LLP

(57) ABSTRACT

The present invention is to provide a liquid crystal display device which hardly causes image sticking even when there is a difference in the pixel areas. The liquid crystal display device of the present invention includes a pair of substrates, and a liquid crystal layer sandwiched between the pair of substrates, and is configured such that a pixel is formed by picture elements of a plurality of colors. The liquid crystal display device of the present invention is featured in that one of the pair of substrates includes scanning lines, signal lines, and storage capacitor lines, a thin film transistor connected to each of the scanning line and the signal line, and a pixel electrode connected to the thin film transistor, in that the other of the pair of substrates includes an opposed electrode, in that the pixel electrode is arranged for each of the picture elements, and in that the pixel electrode having a larger area among the plurality of pixel electrodes arranged in one pixel is connected to the thin film transistor having a larger channel width among the plurality of the thin film transistors arranged in the one pixel.

8 Claims, 22 Drawing Sheets

(56) References Cited

U.S. PATENT DOCUMENTS

| | | |
|---|---|---|
| 2003/0227429 A1 | 12/2003 | Shimoshikiryo |
| 2005/0052590 A1* | 3/2005 | Ochiai et al. .................... 349/71 |
| 2005/0213015 A1 | 9/2005 | Shimoshikiryo |
| 2006/0256271 A1 | 11/2006 | Shimoshikiryo |
| 2007/0019145 A1 | 1/2007 | Rho et al. |
| 2009/0251627 A1 | 10/2009 | Itsumi et al. |
| 2010/0118013 A1 | 5/2010 | Kitayama et al. |

FOREIGN PATENT DOCUMENTS

| | | |
|---|---|---|
| JP | 2001-296523 A | 10/2001 |
| JP | 2003-091017 A | 3/2003 |
| JP | 2004-062146 A | 2/2004 |
| JP | 2006-259501 A | 9/2006 |
| JP | 2007-025697 A | 2/2007 |
| JP | 2008-209942 A | 9/2008 |
| WO | 2008/081624 A1 | 7/2008 |
| WO | 2008/152847 A1 | 12/2008 |

* cited by examiner

LIQUID CRYSTAL DISPLAY DEVICE

TECHNICAL FIELD

The present invention relates to a liquid crystal display device. More specifically, the present invention relates to a liquid crystal display device that adopts a driving method using a thin film transistor.

BACKGROUND ART

A liquid crystal display (LCD) device is a device which performs display in such a manner that the optical property of light emitted from a light source is controlled by using a liquid crystal layer, and the like, filled between a pair of substrates, and is widely used in various fields by taking advantage of its features, such as thin profile, light weight and low power consumption.

In the liquid crystal display device, an alignment state of liquid crystal molecules is changed by applying a voltage to the liquid crystal layer by using a pair of electrodes formed on the substrates, and thereby a polarization state of the light passing through the liquid crystal layer is changed. In the liquid crystal display device, color filters of a plurality of colors are formed to perform color display. The pair of substrates sandwiching the liquid crystal layer are held by spacers so as to have a uniform gap (cell gap) therebetween and are bonded to each other by a sealing material.

In the liquid crystal display device, subsidiary pixels of three colors of red (R), green (G) and blue (B) are usually formed. A color filter of each color is arranged for each of the subsidiary pixels, and color control is performed for each pixel by adjusting light passing through the color filter of each color.

In recent years, there has been made such a contrivance that, in addition to the RGB, a white (W) subsidiary pixel is arranged in order to increase luminance (see, for example, Patent Literature 1). Further, a method has also been investigated in which the areas of the RGBW subsidiary pixels are made different for each color so as to suitably adjust color balance (see, for example, Patent Literature 2).

In the liquid crystal display device, pixel electrodes are usually arranged in a matrix form, and each of the pixel electrodes is driven through a switch formed by a thin film transistor (TFT). The TFT is a three terminal field-effect transistor, and a drain electrode of each of the TFTs is connected to the pixel electrode corresponding to the TFT. A gate electrode of each of the TFTs is connected to a gate bus line of each row of the matrix. A source electrode of each of the TFTs is connected to a source bus line of each column of the matrix. A desired image can be obtained by applying an image signal to the source bus line and by sequentially scanning the gate bus line.

Some of the liquid crystal display devices have a multi-gap configuration in which a thickness (cell gap) of the liquid crystal layer is made different for the subsidiary pixel of each color. However, when a size of the cell gap is made different, a value of capacitance associated with the pixel electrode is changed. Therefore, in order to eliminate the difference in the pixel capacitance between the subsidiary pixels, it is necessary to make contrivances such as (a) making storage capacitance different for each of the pixels by equalizing pixel electrode areas or (b) equalizing the storage capacitance between the pixels by making the pixel electrode areas different from each other (see, for example, Patent Literature 3).

Further, in the liquid crystal display device, in order to solve a viewing angle dependency problem due to a difference in γ characteristics between the time when the display is viewed in a front direction and the time when the display is viewed in an oblique direction, there is a case where a pixel is divided into a plurality of sub-pixels, and where the γ characteristics of the respective sub-pixels are made close to each other (see, for example, Patent Literature 4). The γ characteristics mean gradation dependency of display luminance. That the γ characteristics are different between the time when the display is viewed in the front direction and the time when the display is viewed in the oblique direction means that a gradation display state is changed according to the observation direction. The viewing angle dependency problem due to the γ characteristics can be eliminated in such a manner that a state having different γ characteristics is formed by applying a different voltage to the liquid crystal layer corresponding to each of the sub-pixels.

Further, as a method for forming a spacer, a method has also been tried in which, when color filters are formed in correspondence with RGB subsidiary pixels, the color filters are also similarly formed at a place where the spacer is to be formed, and are laminated to form the spacer (see, for example, Patent Literature 5). In Patent Literature 5, in order to compensate a change in the capacitance of each pixel due to the spacer formed in the subsidiary pixel, a method has been investigated which equalizes a capacitance ratio of each of the respective pixels by changing a size of storage capacitor line.

CITATION LIST

Patent Literature

Patent Literature 1: JP 2001-296523 A
Patent Literature 2: JP 2007-25697 A
Patent Literature 3: JP 6-11733 A
Patent Literature 4: JP 2004-62146 A
Patent Literature 5: WO 2008/081624

SUMMARY OF INVENTION

Technical Problem

During the investigation of a liquid crystal display device including subsidiary pixels (hereinafter also referred to as picture elements) of a plurality of colors, the present inventors paid attention to a phenomenon in which, when a pitch (lateral length) is different between the picture elements, and when a white window screen is displayed on a halftone background for a long time and then a halftone solid screen is displayed, only the color in the portion corresponding to the white window is seen to be different from the color of the background portion.

FIG. 55 is a schematic view showing a state when a white window is displayed on the halftone background, and FIG. 56 is a schematic view showing a state of the halftone solid display when the white window is eliminated. As shown in FIG. 55 and FIG. 56, in the state of the halftone solid display, image sticking due to the display before the deletion of the white window occurs in the region in which the white window was displayed.

The present inventors made various investigations about the cause of occurrence of such phenomenon and found out that the image sticking occurs in the display because the pitches of the picture elements are different from each other and thereby the pixel electrode areas are made different from each other, so that the pixel capacitance is made different for each of the picture elements.

When the area of the picture element is different for each color, the value of the electrostatic capacitance formed by the pixel electrode is also different for each of the picture elements. FIG. 57 is a schematic view showing signal waveforms of the drain voltages of two pixel electrodes arranged adjacently to each other.

The signal waveforms shown on a left side of FIG. 57 are waveforms associated with a picture element having a smaller pitch, and the signal waveforms shown on a right side of FIG. 57 are waveforms associated with a picture element having a larger pitch. As shown in FIG. 57, an effective value of the drain voltage (Vd) is different for each picture element. This is because the magnitude of the pull-in voltage (ΔVd) is different between the picture elements, and because the polarity of drain voltages (Vd(+), Vd(−)) is changed at each timing when the AC driving of the pixel electrode is performed. Since an opposed electrode is not formed for each of the pixels, an opposed voltage is set to a value common to all the pixels. Therefore, a value of the optimum opposed voltage determined by the value of the drain voltage (Vd(+), Vd(−)) after pull-in is set to a value different for each of the picture elements, and hence it is difficult that all the picture elements are suitably driven by an opposed voltage common to all the picture elements.

Further, according to the investigation of the present inventors, it was found that such variation in the optimum opposed voltage causes image sticking so as to affect the display.

The present invention has been made in view of the above described circumstances. An object of the present invention is to provide a liquid crystal display device which hardly causes image sticking even when the areas of the picture elements are made different from each other.

Solution to Problem

In order to suppress the image sticking, the present inventors have investigated various methods for making the optimum opposed voltage equal between the picture elements, and paid attention to the fact that one of factors required to adjust the optimum opposed voltage is ΔVd described above. When the values of ΔVd of the picture elements are made close to each other, the optimum opposed voltages are also made equal to each other between the picture elements. The value of ΔVd can be expressed as $\Delta Vd = \alpha \times Vg^{p-p}$. As shown in FIG. 57 described above, the value of $Vg^{p-p}$ represents a gate voltage change at the time when the TFT is turned off. It is necessary to keep the value of $Vg^{p-p}$ at a fixed value to some extent, and hence it is necessary to adjust the value of α in order to change the value of ΔVd. The value of α is expressed as $\alpha = Cgd/Cgd+Csd+Ccs+Clc$. Reference character Cgd denotes parasitic capacitance between the gate and the drain, reference character Cgd denotes parasitic capacitance between the source and the drain, reference character Ccs denotes parasitic capacitance between the Cs and the drain, and reference character Clc denotes liquid crystal capacitance. A total value of Cgd+Csd+Ccs+Clc, which is hereinafter also referred to as Cpix, represents the total capacitance (that is, pixel capacitance) connected to the drain of the TFT.

As a result of an extensive investigation of means for effectively adjusting the value of α, the present inventors paid attention to a channel region of TFT and found out that the balance of suitable pixel capacitance can be effectively adjusted by making the channel region of TFT different for each of the picture elements. The channel region of TFT means a region in a semiconductor layer, which region forms a passage (channel) that enables current to flow between the source electrode and the drain electrode according to the charges supplied to the gate electrode.

The size of the channel region of TFT has a large influence on the characteristics of TFT. As the width of the channel region is increased, the current characteristic becomes better, and a change in the size of the channel region exerts an influence on the value of Cgd which are components of Cpix.

The present inventors found out that the optimum opposed voltage can be easily made equal between the picture elements by connecting a TFT having a larger width of the channel region to a pixel electrode having a larger area, and thereby the generation of image sticking can be suppressed. As a result, the present inventors came up with an idea that, with such means, the above described problems can be effectively solved, and reached the present invention.

That is, the present invention is to provide a liquid crystal display device which includes a pair of substrates, and a liquid crystal layer sandwiched between the pair of substrates, and in which a pixel is formed by picture elements of a plurality of colors, the liquid crystal display device being featured in that one of the pair of substrates includes scanning lines, signal lines, and storage capacitor lines, a thin film transistor connected to each of the scanning line and the signal line, and a pixel electrode connected to the thin film transistor, in that the other of the pair of substrates includes an opposed electrode, in that the pixel electrode is arranged for each of the picture elements, and in that the pixel electrode having a larger area among the plurality of pixel electrodes arranged in one pixel is connected to the thin film transistor having a larger channel width among the plurality of the thin film transistors arranged in the one pixel.

The liquid crystal display device of the present invention includes a pair of substrates, and a liquid crystal layer sandwiched between the pair of substrates, and is configured such that a pixel is formed by picture elements of a plurality of colors. For example, one of the pair of substrates can be used as an array substrate, and the other of the pair of substrates can be used as a color filter substrate. The picture elements of the plurality of colors can be realized by color filters respectively arranged in correspondence with picture elements, and various display colors can be expressed by adjusting the balance of the respective colors.

One of the pair of substrates includes scanning lines (hereinafter also referred to as gate bus lines), signal lines (hereinafter also referred to as source bus lines), storage capacitor lines (hereinafter also referred to as Cs bus lines), a thin film transistor (TFT) connected to each of the scanning lines and each of the signal lines, and a pixel electrode connected to the thin film transistor. The drain electrode of each of the TFTs is connected to the pixel electrode corresponding to the TFT. The gate electrode of each of the TFTs is connected to the gate bus line of each row. The source electrode of each of the TFTs is connected to the source bus line of each column. A desired image can be obtained by supplying an image signal to the source bus line and by applying a voltage to the gate bus line at a predetermined timing.

In the above-described configuration, it is necessary that the scanning line, the signal line, the storage capacitor line, the thin film transistor, and the pixel electrode are arranged respectively via insulating films, or the like, and at certain intervals so as to be electrically isolated from each other. Further, the pixel electrode and the opposed electrode are arranged to be separated from each other via the liquid crystal layer. Therefore, a certain amount of electrostatic capacitance is formed between each of the lines and each of the electrodes, and between the electrodes. Specifically, the scanning line and the pixel electrode form gate-drain capacitance (Cgd), the signal line and the pixel electrode form source-drain capacitance (Csd), the storage capacitor line and the pixel electrode form a storage capacitance (Ccs), and the pixel electrode and the opposed electrode form liquid crystal capacitance (Clc).

The other of the pair of substrates includes the opposed electrode. Since an electric field is formed between the pixel electrode and the opposed electrode, and since each of the pixel electrodes is individually controlled by the thin film transistor, the orientation of the liquid crystal can be controlled for each of the picture elements, and thereby the whole screen can be precisely controlled.

The pixel electrode is arranged for each of the picture elements, and the pixel electrode having a larger area among the plurality of pixel electrodes arranged in one pixel is connected to the thin film transistor having a larger channel width among the plurality of the thin film transistors arranged in the one pixel. In other words, the pixel electrode having a smaller area among the plurality of pixel electrodes arranged in one pixel is connected to the thin film transistor having a smaller channel width among the plurality of the thin film transistors arranged in the one pixel. The channel width does not mean the interval between the source electrode and the drain electrode (hereinafter also referred to as channel length) in plan view of a thin film transistor, but means the width of the region formed by the source electrode and the drain electrode which face each other. There is a correlation between the channel width and the value of pixel capacitance, and there is a correlation between the value of pixel capacitance and the pixel electrode area. When a TFT having a larger channel width is connected to a pixel electrode having a larger area, and when a TFT having a smaller channel width is connected to a pixel electrode having a smaller area, the variation of the optimum opposed voltage between the picture elements can be suppressed on the basis of the characteristics of the TFTs.

The configuration of the liquid crystal display device of the present invention is not especially limited as long as it essentially includes such components. Preferable embodiments of the liquid crystal display device of the present invention are mentioned in more detail below.

It is preferred that the overlapping area of the scanning line and the pixel electrode having a larger area is different from the overlapping area of the scanning line and the pixel electrode having a smaller area. Thereby, the value of the gate-drain capacitance (Cgd) formed between the scanning line and the pixel electrode can be changed, and hence more suitable adjustment can be performed.

It is preferred that the overlapping area of the signal line and the pixel electrode having a larger area is different from the overlapping area of the signal line and the pixel electrode having a smaller area. Thereby, the value of the source-drain capacitance (Csd) formed between the signal line and the pixel electrode can be changed, and hence more suitable adjustment can be performed.

It is preferred that the overlapping area of the storage capacitor line and the pixel electrode having a larger area is different from the overlapping area of the storage capacitor line and the pixel electrode having a smaller area. Thereby, the value of the storage capacitance (Ccs) formed between the storage capacitor line and the pixel electrode can be changed, and hence more suitable adjustment can be performed.

It is preferred that the thickness of the liquid crystal layer overlapping the pixel electrode having a larger area is different from the thickness of the liquid crystal layer overlapping the pixel electrode having a smaller area. Thereby, the value of the liquid crystal capacitance (Clc) formed between the pixel electrode and the opposed electrode can be changed, and hence more suitable adjustment can be performed.

It is preferred that the scanning line and the pixel electrode form the gate-drain capacitance (Cgd), that the signal line and the pixel electrode form the source-drain capacitance (Csd), that the storage capacitor line and the pixel electrode form the storage capacitance (Ccs), that the pixel electrode and the opposed electrode form the liquid crystal capacitance (Clc), that the ratio of the gate-drain capacitance to the total of the gate-drain capacitance, the source-drain capacitance, the storage capacitance, and the liquid crystal capacitance (the value of this ratio of the gate-drain capacitance is hereinafter set as $\alpha$) is different for each of the picture elements of the plurality of colors, and that, among the ratios of the gate-drain capacitance respectively obtained for the picture elements of the plurality of colors, the difference between the largest ratio of the gate-drain capacitance and the smallest ratio of the gate-drain capacitance is 10% or less of the smallest ratio of the gate-drain capacitance.

It is preferred that the values of $\alpha$ of the picture elements in this case are close to each other. Further, when the values of $\alpha$ are set in the above-described range, the difference between the optimum opposed voltages of the respective picture elements can be eliminated so that the image sticking can be sufficiently suppressed.

It is preferred that, in the one picture element, the value of the response coefficient ("Cpix(min)/Cpix(max)") obtained by calculating a ratio of the maximum value of the total of the gate-drain capacitance, the source-drain capacitance, and the storage capacitance, and the liquid crystal capacitance, with respect to the minimum value of the total of the gate-drain capacitance, the source-drain capacitance, and the storage capacitance, and the liquid crystal capacitance is different for each of the picture elements of the plurality of colors, and that, among the response coefficients respectively obtained for the picture elements of the plurality of colors, the difference between the largest response coefficient and the smallest response coefficient is 5% or less of the smallest response coefficient.

It is preferred that the pixel electrode is configured by a plurality of sub-pixel electrodes divided from each other in one picture element, that the thin film transistors are connected to the sub-pixel electrodes respectively, that the storage capacitor lines overlap the sub-pixel electrodes respectively, and that the liquid crystal display device includes a driving circuit which inverts the polarity of the voltage of the storage capacitor line at regular time intervals. In the following, the method, in which one picture element is controlled by using a plurality of sub-pixel electrodes in this way, is also referred to as a multi-driving method. When a plurality of sub-pixel electrodes are arranged in the same picture element and are respectively driven by different effective voltages, a state where different $\gamma$ characteristics are mixed is formed, so that the visual angle dependency based on the $\gamma$ characteristics can be eliminated. Further, an increase in the number of extra lines can be prevented by driving the sub-pixel electrodes by the multi-driving method using the change in the voltage of the storage capacitor line.

It is preferred that the ratio of the storage capacitance with respect to the total of the gate-drain capacitance, the source-drain capacitance, and the storage capacitance, and the liquid crystal capacitance (the value of this ratio of the storage capacitance is hereinafter set as K) is different for each of the picture elements of the plurality of colors, and that, among the ratios of the storage capacitance respectively obtained for the picture elements of the plurality of colors, the difference between the largest ratio of the storage capacitance and the smallest ratio of the storage capacitance is 1.0% or less of the smallest ratio of the storage capacitance.

Advantageous Effects of Invention

With the liquid crystal display device of the present invention, the variation in the optimum opposed voltage is adjusted between the picture elements, and hence the generation of image sticking can be suppressed.

DESCRIPTION OF EMBODIMENTS

Figure 1:
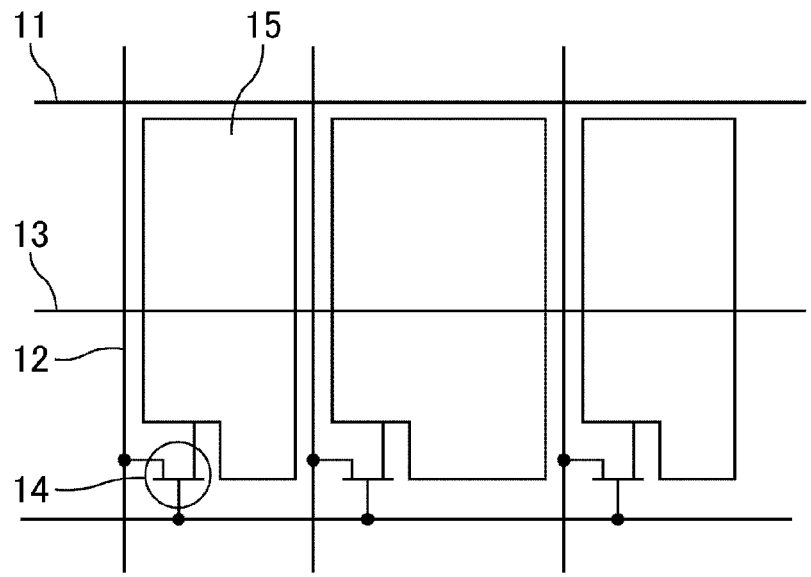
FIG. 1 is a schematic plan view showing an arrangement configuration of pixel electrodes, TFTs and various lines of a liquid crystal display device of Embodiment 1.

The present invention will be mentioned in more detail referring to the drawings in the following embodiments, but is not limited to these embodiments.

Embodiment 1

FIG. 1 is a schematic plan view showing an arrangement configuration of pixel electrodes, TFTs and various lines of a liquid crystal display device of Embodiment 1. As shown in FIG. 1, one pixel electrode is arranged for one picture element in Embodiment 1. Also, one pixel is configured by a plurality of picture elements, and hence each of the picture elements is individually controlled to control each pixel, and to further control the whole display of the liquid crystal display device.

A liquid crystal display device of Embodiment 1 includes gate bus lines 11 extending in the row direction (lateral direction), and source bus lines 12 extending in the column direction (longitudinal direction). Further, the liquid crystal display device includes a TFT 14 connected to both of the gate bus line 11 and the source bus line 12. The TFT 14 is also connected to a pixel electrode 15. Further, the liquid crystal display device includes a Cs bus line 13 which overlaps at least apart of the pixel electrode 15. For example, as shown in FIG. 1, the Cs bus line 13 is formed to extend in the row direction so as to cross the center portion of the pixel electrode 15.

Figure 2:
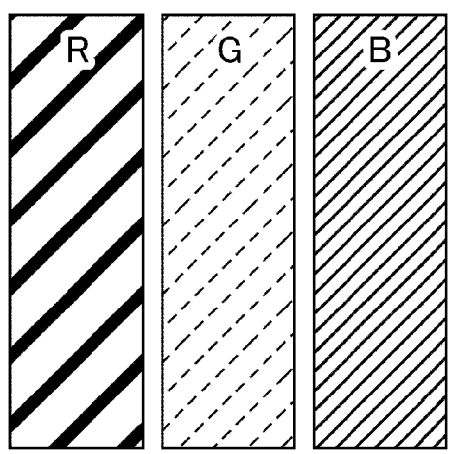
FIG. 2 is a schematic plan view when color filters in Embodiment 1 are arranged in a stripe shape.
Figure 3:
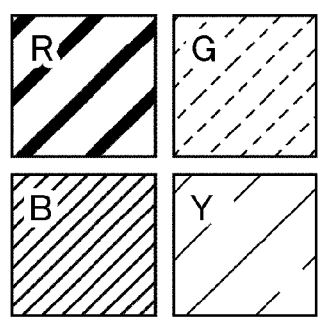
FIG. 3 is a schematic plan view when the color filters in Embodiment 1 are arranged in a two-by-two matrix shape.

In Embodiment 1, a kind of color filter is arranged for one picture element. Examples of the kinds, the number and the arrangement order of colors of the picture elements configuring a pixel include, but are not limited in particular to, combinations, such as RGB, RGBY and RGBW. The color of a picture element is determined by a color filter. Examples of arrangement forms of color filters include a stripe arrangement, as shown in FIG. 2, in which color filters are formed to extend in the longitudinal direction regardless of the boundary of the pixel electrode, and a two-by-two matrix arrangement having four colors, as shown in FIG. 3, in which two color filters are arranged in each of the row direction and the column direction.

Figure 4:
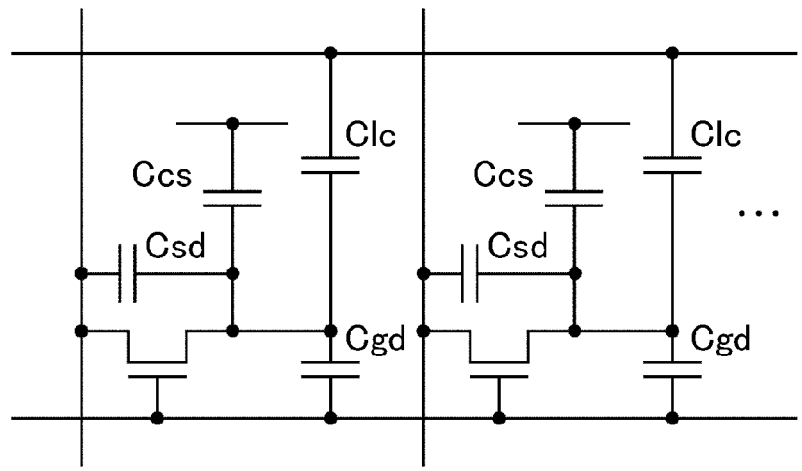
FIG. 4 is an equivalent circuit diagram in the liquid crystal display device of Embodiment 1.

FIG. 4 is an equivalent circuit diagram in the liquid crystal display device of Embodiment 1. In Embodiment 1, a circuit pattern is formed for each picture element (subsidiary pixel), and hence circuit patterns for two picture elements are illustrated in FIG. 4.

A liquid crystal capacitance Clc is formed by the pixel electrode and the opposed electrode which are arranged to face each other via the liquid crystal layer. The value of Clc is dependent on an effective voltage (V) applied to the liquid crystal layer by the pair of electrodes. A storage capacitance Ccs is formed by the pixel electrode and the Cs bus line (storage capacitor line) which are arranged to face each other via an insulating layer. A gate-drain capacitance Cgd is formed by the pixel electrode and the gate bus line (scanning line) which are arranged to face each other via an insulating layer. A source-drain capacitance Csd is formed by the pixel electrode and the source bus line (signal line) which are arranged to face each other via an insulating layer.

The TFT (thin film transistor) includes a semiconductor layer made of silicon, and the like, and three electrodes of a gate electrode, a source electrode, and a drain electrode. The pixel electrode is connected to the drain electrode of the TFT. The gate electrode of the TFT is connected to the gate bus line, and the source electrode of the TFT is connected to the source bus line.

A scanning signal supplied to the gate bus line in a pulse-like manner at a predetermined timing is applied to each of the TFTs at a predetermined timing (by line-sequential writing, every other line writing, two-line simultaneous writing, or the like). Then, an image signal supplied from the source bus line is applied to the pixel electrode connected to the TFT which is turned on for a predetermined time period by the input of the scanning signal.

The image signal having a predetermined level, which is written in the liquid crystal layer for each of the picture elements, is held, for a predetermined time period, between the pixel electrode with the image signal applied thereto and the opposed electrode facing the pixel electrode. After the image signal is applied, the image signal held between the pixel electrode and the opposed electrode may leak, but in order to prevent this leakage, the storage capacitance Ccs is formed in parallel with the liquid crystal capacitance Clc formed between the pixel electrode and the opposed electrode.

In Embodiment 1, as shown in FIG. 1, the lateral lengths of the pixel electrodes 15 are different from each other, and the longitudinal lengths of the pixel electrodes 15 are the same. Therefore, the areas of the pixel electrodes 15 are different from each other.

EXAMPLES

In the following, examples of arrangement forms (Examples 1 to 6) of three color filters of red, green and blue, and of four color filters of red, green, blue and yellow are specifically described.

Example 1

Figure 5:
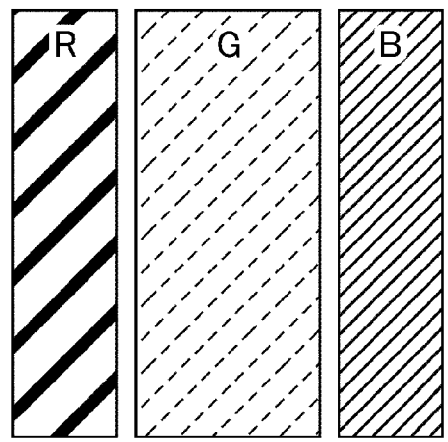
FIG. 5 is a schematic plan view of the color filters for each pixel of Example 1.

FIG. 5 is a schematic plan view of color filters for a pixel of Example 1. As shown in FIG. 5, three color filters of red (R), green (G) and blue (B) are arranged in Example 1. The color filters in Example 1 are arranged in a stripe shape, and picture elements of the same color are arranged in the longitudinal direction of the panel.

The pixel electrodes of the respective three colors of red, green and blue are formed to have the same longitudinal length but to have different lateral lengths (picture element pitches). Therefore, the pixel electrode having a larger picture element pitch has a larger picture element area.

Specifically, the pitch width of the green picture element is larger than the pitch width of the red picture element, and is larger than the pitch width of the blue picture element. The pitch width of the red picture element is the same as the pitch width of the blue picture element. Therefore, the area of the green picture element is larger than the area of the red picture element, and is larger than the area of the blue picture element.

When all the picture elements of red, green and blue are not formed to have the same pitch width, and when the ratio of the green picture element is increased, higher transmissivity is obtained as compared with the case where the ratios of these picture elements are the same. Note that, when the area of the pixel electrode is different between the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

In Example 1, the balance between the values of $\alpha=Cgd/(Cgd+Csd+Ccs+Clc)$ of the picture elements is adjusted by using the channel width of the TFT. Specifically, a TFT having a larger channel width is arranged for the pixel electrode having a larger area. Therefore, the channel width of the TFT arranged for the green picture element is larger than the channel width of the TFT arranged for the red picture element, and is larger the channel width of the TFT arranged for the blue picture element.

Thereby, it is possible to easily adjust, for each of the picture elements, the balance of the gate-drain capacitance (Cgd) formed between the gate bus line and the pixel electrode, the source-drain capacitance (Csd) formed between the source bus line and the pixel electrode, the storage capacitance (Ccs) formed between the Cs bus line and the pixel electrode, and the liquid crystal capacitance (Clc) formed between the pixel electrode and the opposed electrode.

FIG. 6 to FIG. 10 are schematic plan views respectively showing examples of means for making the channel width d (d1 to d8) of the TFT different between the picture elements in Example 1. As shown in FIG. 6 to FIG. 10, a TFT 14 is connected to each of a gate bus line 11 and a source bus line 12. The TFT 14 includes, as components, a semiconductor layer formed of silicon, and the like, a source electrode 22 extended from a part of the source bus line 12, a drain electrode 23 that supplies an image signal from the source bus line 12 to the pixel electrode via the semiconductor layer, and a gate electrode that is a region of the gate bus line 11, which region overlaps the semiconductor layer.

The drain electrode 23 is extended toward the center of the picture element, and is formed to have a certain spread. A contact hole 24 is formed through the insulating layer formed on a portion 23a having the fixed spread, and the drain electrode 23 and the pixel electrode are electrically connected to each other via the contact hole 24.

The portion 23a of the drain electrode 23, which portion has the certain spread, can form a storage capacitance together with the Cs bus line arranged under the portion 23a via the insulating layer.

The semiconductor layer provided in the TFT 14 overlaps both of the source electrode 22 and the drain electrode 23. The region of the semiconductor layer, which region overlaps the source electrode 22, is a source region, and the region of the semiconductor layer, which region overlaps the drain electrode 23, is a drain region. Further, the region of the semiconductor layer, which region does not overlap both of the source electrode 22 and the drain electrode 23, and which region is located between the source electrode 22 and the drain electrode 23 in plan view, is a channel region 21. Therefore, the semiconductor layer 21 has three regions of the source region, the channel region 21, and the drain region.

The channel region 21, which overlaps the gate bus line 11, enables an image signal to be supplied from the source electrode 22 to the drain electrode 23 only when a scanning signal is inputted into the gate bus line 11. Since the length (distance between the source electrode 22 and the drain electrode 23) of the channel region 21 is determined to be an appropriate value to some extent, it is not preferred to change the length of the channel region 21 for each of the picture elements, but the width d of the channel region 21 can be adjusted. When the width d of the channel region 21 with respect to the length of the channel region 21 is expanded, the conductivity of the TFT 14 can be further improved. Therefore, in Example 1, the channel width d in the green picture element is formed to be larger than the channel width d in the red and blue picture elements.

Thereby, the value of the gate-drain capacitance (Cgd) formed between the gate bus line and the pixel electrode is changed, and hence, by the use of this change, the values of the optimum opposed voltages in the picture elements are respectively adjusted so as to become close to each other.

Figure 6:
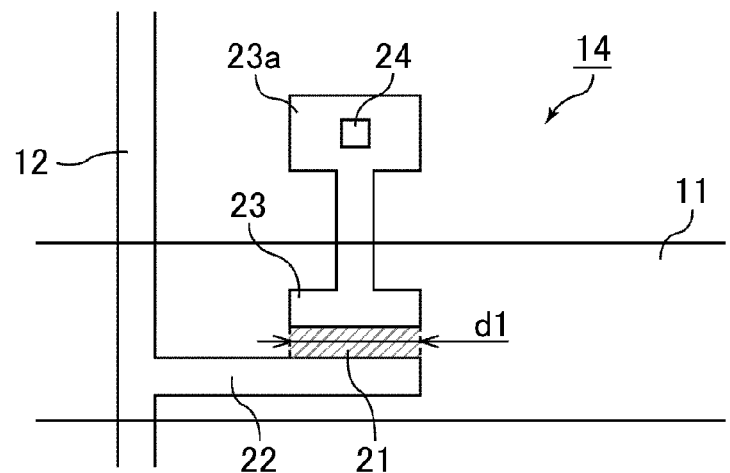
FIG. 6 is a schematic plan view showing a first example of TFT in which a size of channel width is adjusted.

FIG. 6 is a schematic plan view showing a first example of TFT in which the size of channel width is adjusted. The channel region 21 of the TFT in FIG. 6 is formed between the drain electrode 23 and the source electrode 22, and has the channel width of d1. The value of $\alpha$ can be adjusted by changing the size of d1 for each of the picture elements.

Figure 7:
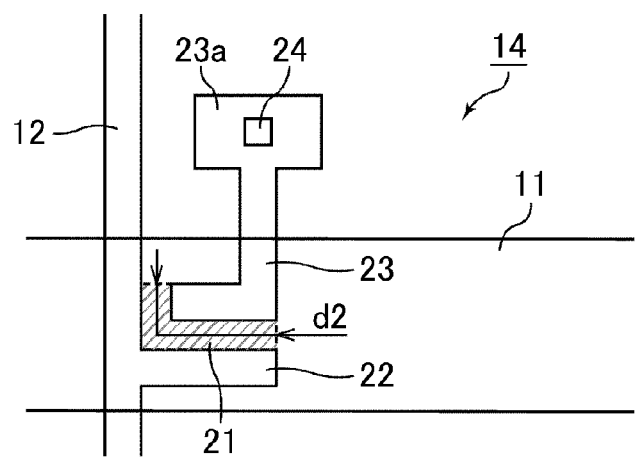
FIG. 7 is a schematic plan view showing a second example of TFT in which the size of channel width is adjusted.
Figure 8:
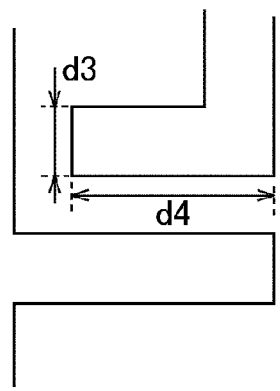
FIG. 8 is a schematic plan view (enlarged view) showing the second example of TFT in which the size of channel width is adjusted.

FIG. 7 and FIG. 8 are schematic plan views showing a second example of TFT in which the size of channel width is adjusted. The channel width 2d of the TFT 14 in FIG. 7 is formed not only between the drain electrode 23 and the source electrode 22 but also between the drain electrode 23 and apart of the source bus line 12, and has the channel width of d2. In this case, as shown in FIG. 8, the channel width d2 of the TFT 14 becomes the length of the sum of the length d3 of the portion facing the source bus line 12 and the length d4 of the portion facing the source electrode 22. The value of $\alpha$ can be adjusted by changing the size of d2 for each of the picture elements.

Figure 9:
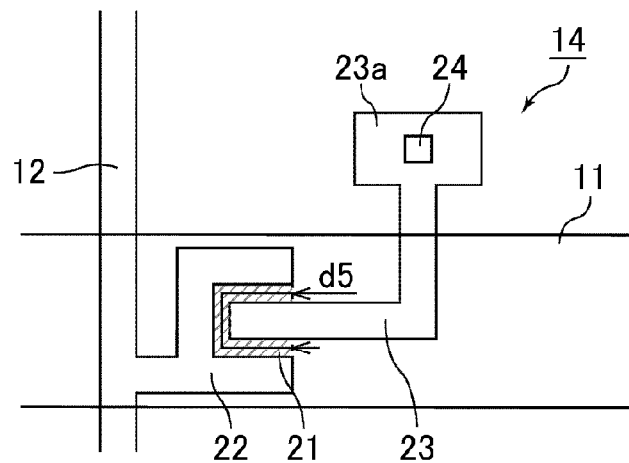
FIG. 9 is a schematic plan view showing a third example of TFT in which the size of channel width is adjusted.
Figure 10:
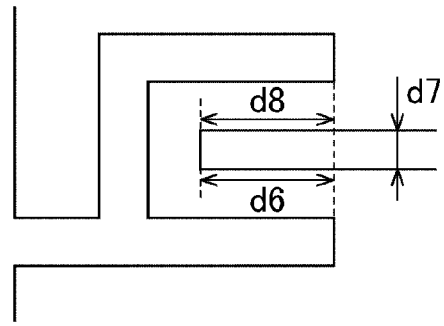
FIG. 10 is a schematic plan view (enlarged view) showing the third example of TFT in which the size of channel width is adjusted.

FIG. 9 and FIG. 10 are schematic plan views showing a third example of TFT in which the size of channel width is adjusted. In the TFT 14 shown in FIG. 9, the source electrode 22 extended from a part of the source bus line 12 is branched in the middle so as to have a shape surrounding the distal end of the drain electrode 23. In this case, as shown in FIG. 10, the channel width d5 of the TFT 14 becomes the length of the sum of the lengths d6 and d8 of the portions in parallel with the gate bus line 11, and the length d7 of the portion in parallel with the source bus line 12. The value of α can be adjusted by changing the size of d5 for each of the picture elements.

In Example 1, it is preferred that the values of α of the picture elements are close to each other. Specifically, it is preferred that the ratio of the values of α of the picture elements, which ratio is expressed as: "(maximum value of α−minimum value of α)/(minimum of value of α)," is 10% or less. When the values of α of the picture elements are set close to each other, the variation in ΔVd which is the pull-in voltage is suppressed, and thereby the optimum opposed voltages between the picture elements are made close to each other. Thereby, the possibility of occurrence of image sticking can be greatly reduced. The value of α is obtained by the expression: $\alpha = C_{gd}/C_{pix}(C_{gd}+C_{sd}+C_{cs}+C_{lc})$. For this reason, the parameters included in the expression need to be adjusted, in order to adjust the balance between the values of α of the picture elements. The balance between the values of α of the picture elements can be effectively adjusted by adjusting the channel width.

Example 2

Figure 11:
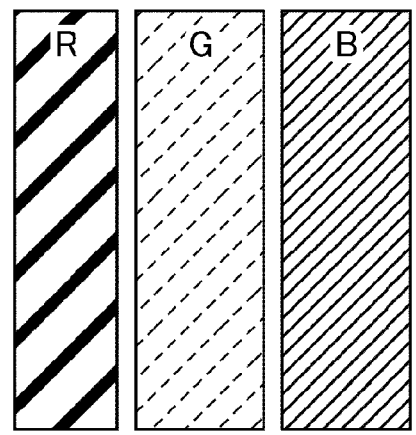
FIG. 11 is a schematic plan view of color filters for each pixel of Example 2.

FIG. 11 is a schematic plan view of color filters for a pixel of Example 2. As shown in FIG. 11, the color filters in Example 2 are arranged in a stripe shape, and picture elements of the same color are arranged in the longitudinal direction of the panel. Further, three color filters of red (R), green (G) and blue (B) are used in Example 2. The arrangement order of the colors is not limited in particular. In Example 2, the pitch width of the red (R) picture element is smaller than the pitch widths of the green (G) picture element and of the blue (B) picture element. The pitch width of the green (G) picture element is the same as the pitch width of the blue (B) picture element.

When all the picture elements of red, green and blue are not formed to have the same pitch width, and when the ratio of the red picture element is reduced, higher transmissivity is obtained as compared with the case where the ratios of these picture elements are the same. Note that, when the area of the pixel electrode is different between the picture elements, the color balance may be deteriorated, but the color balance can be adjusted by controlling the backlight. Specifically, the color balance can be adjusted, such as by controlling the backlight signal, and by changing the phosphor ratio of the light source used for the backlight. The same effects as described above can be obtained in Example 3 to Example 7 described below.

Example 3

Figure 12:
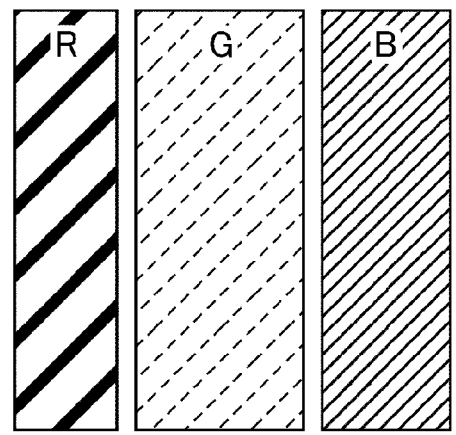
FIG. 12 is a schematic plan view of color filters for each pixel of Example 3.

FIG. 12 is a schematic plan view of color filters for a pixel of Example 3. As shown in FIG. 12, the color filters in Example 3 are arranged in a stripe shape, and picture elements of the same color are arranged in the longitudinal direction of the panel. Further, three color filters of red (R), green (G) and blue (B) are used in Example 3. The arrangement order of the colors is not limited in particular. In Example 3, the pitch width of the red (R) picture element is smaller than the pitch width of the blue (B) picture element, and the pitch width of the blue (B) picture element is smaller than the pitch width of the green (G) picture element.

When all the picture elements of red, green and blue are not formed to have the same pitch width, and when the ratio of the red picture element is reduced, and also the ratio of the green picture element is increased, higher transmissivity is obtained as compared with the case where the ratios of these picture elements are the same.

Example 4

Figure 13:
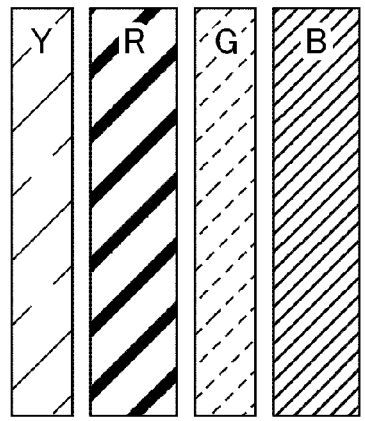
FIG. 13 is a schematic plan view of color filters for each pixel of Example 4.

FIG. 13 is a schematic plan view of color filters for a pixel of Example 4. As shown in FIG. 13, the color filters in Example 4 are arranged in a stripe shape, and picture elements of the same color are arranged in the longitudinal direction of the panel. Further, four color filters of red (R), green (G), blue (B) and yellow (Y) are used in Example 4. The arrangement order of the colors is not limited in particular. In Example 4, the pitch width of the green (G) picture element is the same as the pitch width of the yellow (Y) picture element, and the pitch width of the red (R) picture element is the same as the pitch width of the blue (B) picture element. The pitch width of the green (G) and yellow (Y) picture elements is smaller than the pitch width of the red (R) and blue (B) picture elements.

When all the picture elements of red, green, blue and yellow are not formed to have the same pitch width, and when the ratios of the red and blue picture elements are set higher, and also the ratios of the green and yellow picture elements are set lower, wider color reproducibility is obtained as compared with the case where the ratios of these picture elements are the same.

Example 5

Figure 14:
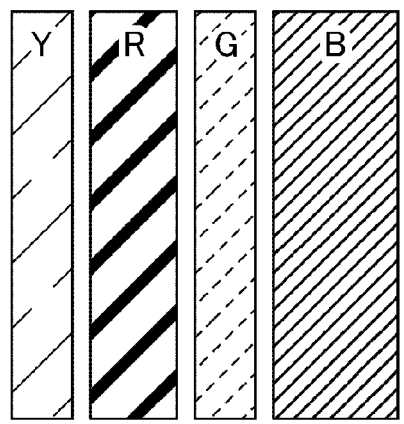
FIG. 14 is a schematic plan view of color filters for each pixel of Example 5.
Figure 15:
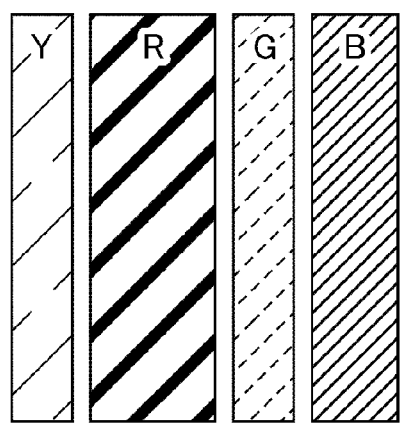
FIG. 15 is a schematic plan view of color filters for each pixel of Example 5.

Each of FIG. 14 and FIG. 15 is a schematic plan view of color filters for a pixel of Example 5. As shown in FIG. 14, the color filters in Example 5 are arranged in a stripe shape, and picture elements of the same color are arranged in the longitudinal direction of the panel. Further, four color filters of red (R), green (G), blue (B) and yellow (Y) are used in Example 5. The arrangement order of the colors is not limited in particular. In Example 5, the pitch width of the green (G) picture element is the same as the pitch width of the yellow (Y) picture element. The pitch width of the red (R) picture element is larger than any of the pitch width of the green (G) picture element and the pitch width of the yellow (Y) picture element. Further, the pitch width of the blue (B) picture element is larger than any of the pitch width of the green (G) picture element and the pitch width of the yellow (Y) picture element.

When all the picture elements of red, green, blue and yellow are not formed to have the same pitch width, and when the ratios of the red and blue picture elements are set higher, and also the ratios of the green and yellow picture elements are set lower, wider color reproducibility is obtained as compared with the case where the ratios of these picture elements are the same.

In the relationship between the pitch widths of the red and blue picture elements, a form is assumed in which one of the pitch widths of the red and blue picture elements is larger than the other. When the pitch width of the blue picture element is larger than the pitch width of the red picture element, the color filters are configured as shown in FIG. 14, while when the pitch width of the red picture element is larger than the pitch width of the blue picture element, the color filters are configured as shown in FIG. 15.

In these cases, it is preferred that the pitch widths of the red and blue picture elements are suitably set according to the arrangement places of the spacers for holding the cell gap, the formation place of the Cs line in the display region, and the like. Specifically, when a multilayer spacer formed by laminating color filters of a plurality of colors is used as the spacer, the multilayer spacer may be formed in the red picture element in order to obtain a sufficient height of the spacer. In this case, it is preferred that the ratio of the red picture element is made smaller than the ratio of the blue picture element. Further, for example, when copper (Cu) is used for the metal line, such as the gate bus line and the source bus line, the light reflected by the copper (Cu) layer may become reddish, and hence the multilayer spacer may be formed in the blue picture element. In this case, it is preferred that the ratio of the blue picture element is made smaller than the ratio of the red picture element.

Example 6

Figure 16:
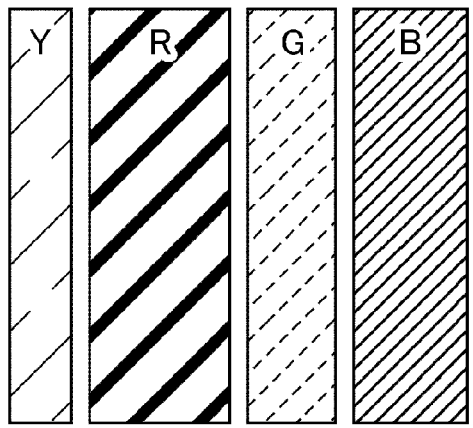
FIG. 16 is a schematic plan view of color filters for each pixel of Example 6.
Figure 17:
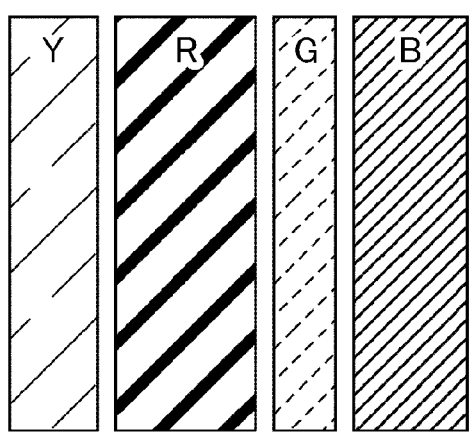
FIG. 17 is a schematic plan view of color filters for each pixel of Example 6.
Figure 18:
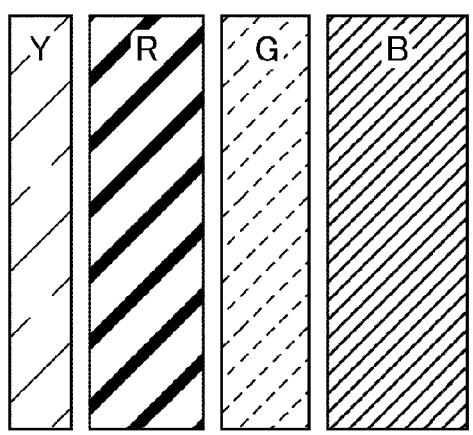
FIG. 18 is a schematic plan view of color filters for each pixel of Example 6.
Figure 19:
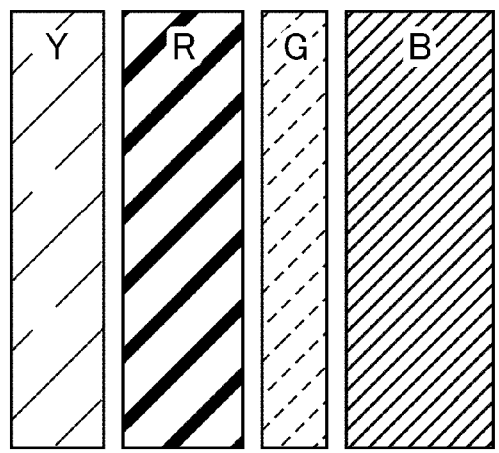
FIG. 19 is a schematic plan view of color filters for each pixel of Example 6.

Each of FIG. 16 to FIG. 19 is a schematic plan view of color filters for a pixel of Example 6. As shown in FIG. 16 to FIG. 19, the color filters in Example 6 are arranged in a stripe shape, and picture elements of the same color are arranged in the longitudinal direction of the panel. Further, four color filters of red (R), green (G), blue (B) and yellow (Y) are used in Example 6. The arrangement order of the colors is not limited in particular. In Example 6, the pitch width of the red (R) picture element is larger than any of the pitch width of the green (G) picture element and the pitch width of the yellow (Y) picture element. Also, the pitch width of the blue (B) picture element is larger than any of the pitch width of the green (G) picture element and the pitch width of the yellow (Y) picture element. In the relationship between the pitch widths of the green and yellow picture elements, a form is assumed in which one of the pitch widths of the green and yellow picture elements is larger than the other. Also, in the relationship between the pitch widths of the red and blue picture elements, a form is assumed in which one of the pitch widths of the red and blue picture elements is larger than the other. FIG. 16 shows a form in which the pitch widths of the picture elements are set as yellow<green<blue<red, and FIG. 17 shows a form in which the pitch widths of the picture elements are set as green<yellow<blue<red. FIG. 18 shows a form in which the pitch widths of the picture elements are set as yellow<green<red<blue, and FIG. 19 shows a form in which the pitch widths of the picture elements are set as green<yellow<red<blue.

When all the picture elements of red, green, blue and yellow are not formed to have the same pitch width, and when the ratios of the red and blue picture elements are set higher, and also the ratios of the green and yellow picture elements are set lower, wider color reproducibility is obtained as compared with the case where the ratios of these picture elements are the same.

In the relationships between the pitch widths of the red and blue picture elements and between the pitch widths of the green and yellow picture elements, it is preferred that, similarly to Example 5, the pitch widths of the picture elements are suitably set according to the arrangement places of the spacers for holding the cell gap, the formation place of the Cs line in the display region, and the like. Specifically, the pitch widths of the picture elements are set as described above.

Example 7

Figure 20:
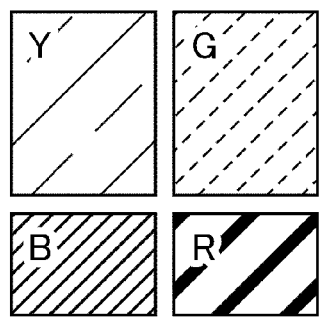
FIG. 20 is a schematic plan view of color filters for each pixel of Example 7.
Figure 21:
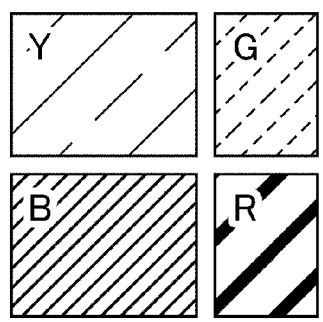
FIG. 21 is a schematic plan view of color filters for each pixel of Example 7.

Each of FIG. 20 and FIG. 21 is a schematic plan view of color filters for a pixel of Example 7. As shown in FIG. 20 and FIG. 21, the color filters in Example 7 are arranged in a two-by-two matrix shape corresponding to four picture elements of red, green, blue and yellow. One picture element is configured by a total of four squares arranged in a matrix shape in which two squares are formed in each of the longitudinal direction and the lateral direction. The arrangement order of the colors is not limited in particular. Any of the patterns of the areas of the picture elements in Examples 4 to 6 can be applied to the areas of the respective picture elements in Example 7. That is, Example 7 is the same as Examples 4 to 6 except that the stripe arrangement of the color filters is changed to the two-by-two matrix arrangement. Note that, in the case of the two-by-two matrix arrangement, a pixel is configured not only by picture elements arranged in the lateral direction but also by picture elements arranged in the longitudinal direction, unlike the case of the stripe arrangement. Therefore, the case where the pitch widths are different in the longitudinal direction as shown in FIG. 20 is assumed, and also the case where the pitch widths are different in the lateral direction as shown in FIG. 21 is assumed.

When all the picture elements of red, green, blue and yellow are not formed to have the same pitch width, and when the ratio of the red picture element is set lower, higher transmissivity is obtained as compared with the case where the ratios of these picture elements are the same.

Figure 22:
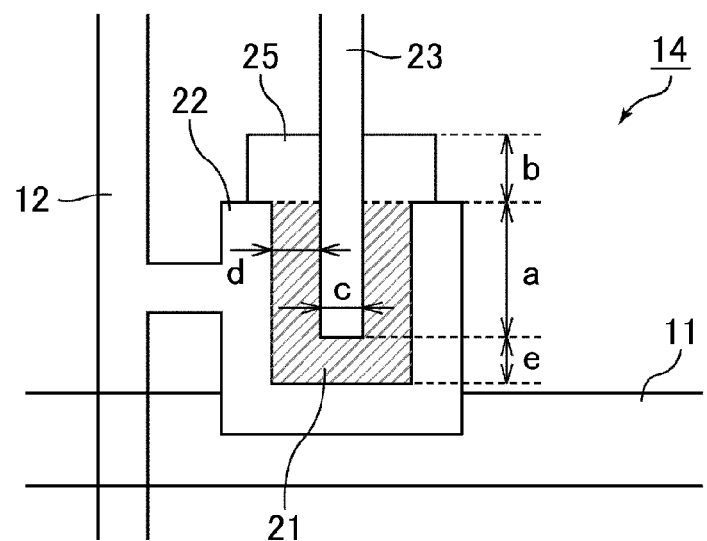
FIG. 22 is a schematic plan view of TFT showing an example in which the size of channel width is actually adjusted in Example 5.

In the following, there will be described an example in which, in the liquid crystal display device of Example 5, the value of α is adjusted by actually adjusting the channel width. FIG. 22 is a schematic plan view showing an example in which the channel width of the TFT in Example 5 is actually adjusted.

As shown in FIG. 22, the TFT 14 includes the source electrode 22 extended from a part of the source bus line 12, a gate electrode 25 extended from a part of the gate bus line 11, and the drain electrode 23 connected to the pixel electrode. The TFT 14 includes a semiconductor layer at a position at which the TFT 14 overlaps the gate electrode 25. A part of the semiconductor layer overlaps a part of each of the source electrodes 22 and the drain electrodes 23. Further, the other part of the semiconductor layer, which part overlaps neither the source electrode 22 nor the drain electrode 23, and which part is sandwiched between the source electrode 22 and the drain electrode 23 in plan view is the channel region 21. Here, the width of the channel region 21 of the semiconductor layer is set to be different for each of the picture elements, but the interval between the source electrode 22 and the drain electrode 23 is set to be the same for each of the picture elements.

In the example shown in FIG. 22, the drain electrode 23 has a linear shape extended in the direction in parallel with the source bus line 12. Further, the source electrode 22 has, in plan view, an opening opened toward the side opposite to the side of the gate bus line 11, and has a shape configured to surround the distal end of the drain electrode 23.

The width of the drain electrode 23 is denoted by reference character c, and the interval between the drain electrode 23 and the source electrode 22 in the direction in parallel with the gate bus line 11 is denoted by reference character d. The distance between the drain electrode 23 and the source electrode 22 in the direction in parallel with the source bus line 12 is denoted by reference character e. The length of the portion of the source electrode 22, which portion faces the drain electrode 23 and which portion is in parallel with the gate bus line 11, is denoted by reference character a. The length obtained by subtracting the length of the portion of the source electrode 22 which portion is in parallel with the source bus line 12 from the length of the portion of the gate electrode 25, which portion is in parallel with the source bus line 12, is denoted by reference character b.

In the liquid crystal display device of Example 5, in the case where, in four color picture elements having different picture element pitches, the pitch widths of the picture elements were set as "blue">"red">"green=yellow," the deviation between the values of α of the picture elements could be suppressed to 3.88% by adjusting the values of a to e between the picture elements as shown in Table 1 described below. Further, ΔVd in the red picture element was 1.838 V, ΔVd in the green and yellow picture elements was 1.901 V, and ΔVd in the blue picture element was 1.910 V. The difference between the maximum and minimum values of ΔVd was 72 mV. Therefore, according to the above-described design, it was possible to obtain a liquid crystal display device in which the generation of image sticking is suppressed by sufficiently adjusting the optimum opposed voltages between the picture elements. Note that the ratio of the pitch width of each of the picture elements was set as "red":"green":"yellow":"blue"=1.4:1:1:1.7.

TABLE 1

|   | Picture element R (μm) | Picture elements G and Y (μm) | Picture element B (μm) |
|---|---|---|---|
| a | 28.0 | 19.0 | 40.5 |
| b | 6.0 | 6.0 | 6.0 |
| c | 5.0 | 5.0 | 5.0 |
| d | 4.5 | 4.5 | 4.5 |
| e | 4.5 | 4.5 | 4.5 |

The following Table 2 is a table showing permissible ranges of the deviation of the value of α when the difference of the value of ΔVd is assumed to be less than 100 mV in the liquid crystal display device of the present invention. It is seen that, when the difference between the values of ΔVd is 100 mV or less, the image sticking can be easily improved, and that, when the difference between the values of ΔVd is 50 mV or less, the image sticking can be more surely improved.

TABLE 2

| ΔVd (V) | Vgpp (V) | α | Deviation of α (%) |
|---|---|---|---|
| 1.0 | 41 | 0.02439 | 10.0 |
| 1.1 | 41 | 0.02683 |  |
| 1.5 | 41 | 0.03659 | 6.7 |
| 1.6 | 41 | 0.03902 |  |
| 2.0 | 41 | 0.04878 | 5.0 |
| 2.1 | 41 | 0.05122 |  |
| 3.0 | 41 | 0.07317 | 3.3 |
| 3.1 | 41 | 0.07561 |  |

As shown in Table 2 described above, the deviation of the value of α was 10.0% at the time when the value of ΔVd was set to 1.0V, and when the difference between the values of ΔVd was set to 100 mV. The deviation of the value of α was 6.7% at the time when the value of ΔVd was set to 1.5 V, and when the difference between the values of ΔVd was set to 100 mV. The deviation of the value of α was 5.0% at the time when the value of ΔVd was set to 2.0 V, and when the difference between the values of ΔVd was set to 100 mV. The deviation of the value of α was 3.3% at the time when the value of ΔVd was set to 3.0 V, and when the difference between the values of ΔVd was set to 100 mV.

It was found to be preferred that, in a normal liquid crystal display device, the value of ΔVd is set in the range of 1.5 to 3.0 V, and that, under this condition, the deviation of the value of α is set in the range of 7.0% or less. Further, it is conceivable that the value of ΔVd may be set as ΔVd=1 V or less in future, and it was found to be preferred that, in this case, the deviation of the value of α is set in the range of 10.0% or less.

Note that, in the case where a normal liquid crystal display device, in which the picture element pitch and the channel width of each of picture elements were set to be the same, was investigated as a comparison example, the deviation of the value of α was 30%.

Figure 23:
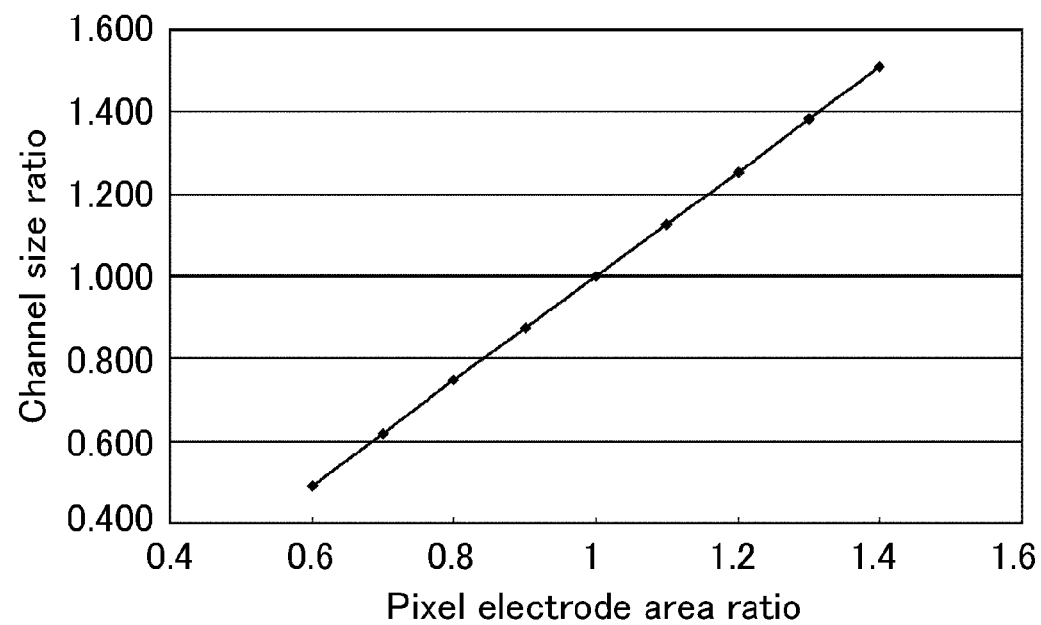
FIG. 23 is a graph showing a relationship between the channel size ratio and the pixel electrode area ratio.

Further, when a relationship between the channel size and the pixel electrode area in the liquid crystal display device of the present invention was investigated, data as shown in Table 3 and FIG. 23 were obtained. FIG. 23 is a graph showing a relationship between the channel size ratio and the pixel electrode area ratio.

TABLE 3

| Channel size ratio | Pixel electrode area ratio |
|---|---|
| 0.491 | 0.6 |
| 0.618 | 0.7 |
| 0.745 | 0.8 |
| 0.873 | 0.9 |
| 1.000 | 1 |
| 1.127 | 1.1 |
| 1.255 | 1.2 |
| 1.382 | 1.3 |
| 1.509 | 1.4 |

The variation of the value of α is suppressed between the picture elements by changing the values of a to e of the TFT channel according to Table 3 and along the straight line shown in FIG. 23, so that a liquid crystal display device with little image sticking can be obtained.

Figure 24:
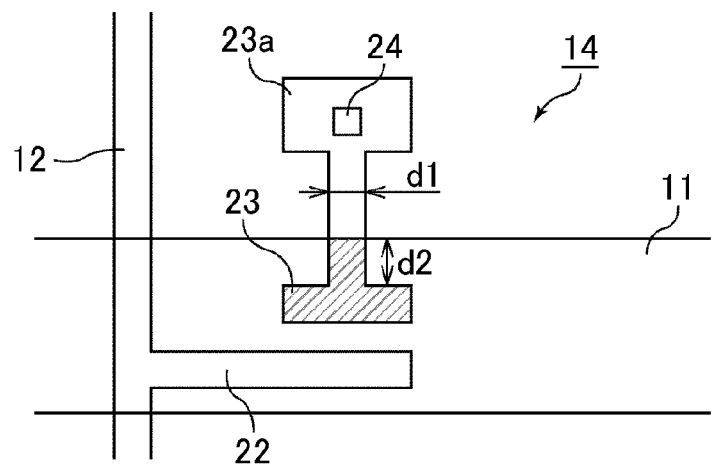
FIG. 24 is a schematic plan view showing a region in which the gate bus line and the drain electrode overlap each other in Embodiment 1.
Figure 25:
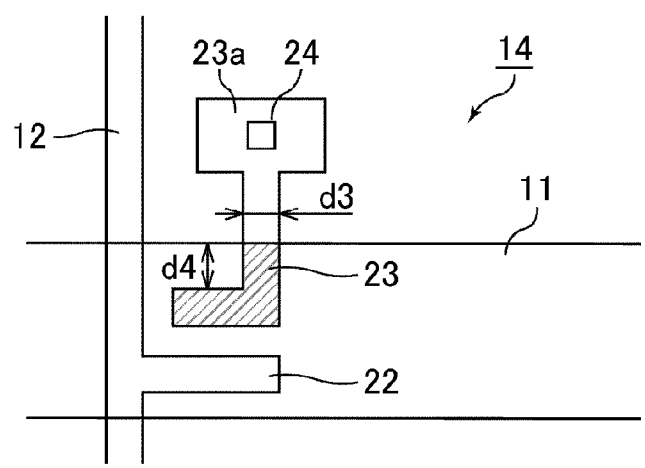
FIG. 25 is a schematic plan view showing a region in which the gate bus line and the drain electrode overlap each other in Embodiment 1.
Figure 26:
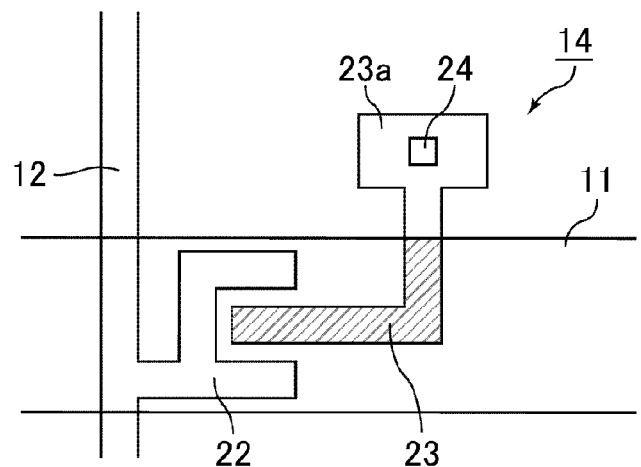
FIG. 26 is a schematic plan view showing a region in which the gate bus line and the drain electrode overlap each other in Embodiment 1.

Further, the difference in the lengths of the source electrode and the drain electrode between the TFTs shown in FIG. 6 to FIG. 8 actually also influences the overlapping area of the gate bus line and the drain electrode as shown in FIG. 24 to FIG. 26. Each of FIG. 24 to FIG. 26 is a schematic plan view showing a region in which the gate bus line and the drain electrode overlap each other in Embodiment 1. Since, as the overlapping area of the gate bus line 11 and the drain electrode 23 is increased, the value of the gate-drain capacitance (Cgd) is more changed, the balance between all the values of α of the picture elements can be adjusted also by adjusting the overlapping area of the gate bus line 11 and the drain electrode 23 in addition to the adjustment of the channel length.

As described above, in Embodiment 1, the balance between the values of α=Cgd/(Cgd+Csd+Ccs+Clc) of the picture elements is adjusted. As can be seen from the above-described expression, it is effective to adjust the gate-drain capacitance Cgd in order to adjust the balance between the values of α of the picture elements.

Actually, the difference in the overlapping area of the drain electrode and the gate bus line in the TFT also influences the gate-drain capacitance (Cgd) formed between the gate bus line and the drain electrode. Since, as the overlapping area of the gate bus line and the drain electrode is increased, the value of the gate-drain capacitance (Cgd) is increased, the balance between the values of α of the picture elements can be adjusted also by adjusting the overlapping area of the gate bus line and the drain electrode.

Figure 27:
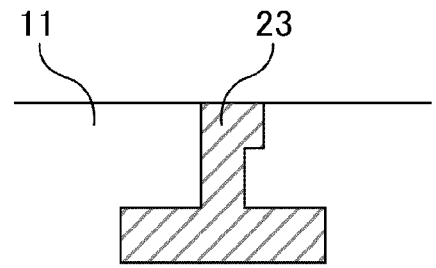
FIG. 27 shows an example of TFT in which the size of the overlapping area of the gate bus line and the drain electrode is adjusted in the example of TFT shown in FIG. 24, and shows a form in which the dimension d1 of the TFT shown in FIG. 24 is changed.
Figure 28:
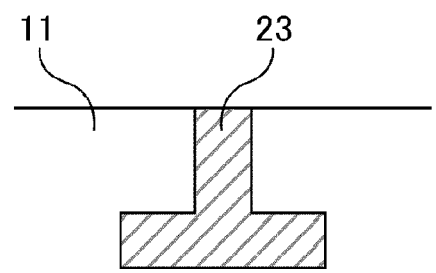
FIG. 28 shows an example of TFT in which the size of the overlapping area of the gate bus line and the drain electrode is adjusted in the example of TFT shown in FIG. 24, and shows a form in which the dimension d1 of the TFT shown in FIG. 24 is changed.
Figure 29:
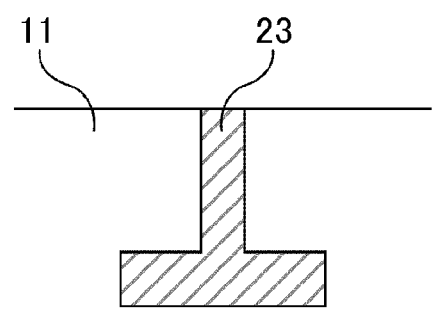
FIG. 29 shows an example of TFT in which the size of the overlapping area of the gate bus line and the drain electrode is adjusted in the example of TFT shown in FIG. 24, and shows a form in which the dimension d2 of the TFT shown in FIG. 24 is changed.
Figure 30:
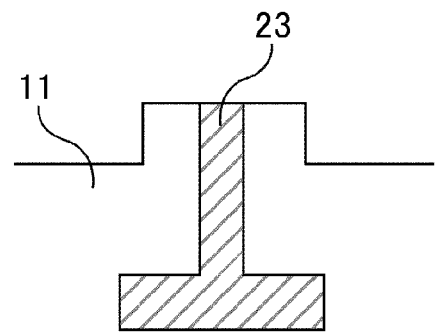
FIG. 30 shows an example of TFT in which the size of the overlapping area of the gate bus line and the drain electrode is adjusted in the example of TFT shown in FIG. 24, and shows a form in which the dimension d2 of the TFT shown in FIG. 24 is changed.

Each of FIG. 27 to FIG. 30 shows an example of TFT in which the size of the overlapping area of the gate bus line and the drain electrode is adjusted in the example of TFT shown in FIG. 24. Each of FIG. 27 and FIG. 28 shows a form in which the channel width d1 of the TFT shown in FIG. 24 is changed. In FIG. 27, a projecting section is provided in a planar shape in a part of the overlapping region of the drain electrode 23 and the gate bus line 11. In FIG. 28, the channel width d1 as a whole is increased. Each of FIG. 29 and FIG. 30 shows a form in which the dimension d2 of the TFT shown in FIG. 24 is changed. In FIG. 29, the length of d2 is increased. In FIG. 30, the shape of the drain electrode 23 is maintained as it is, but a projecting section is provided in a planar shape in a part of the gate bus line 11, so that the overlapping region of the drain electrode 23 and the gate bus line 11 is increased.

Figure 31:
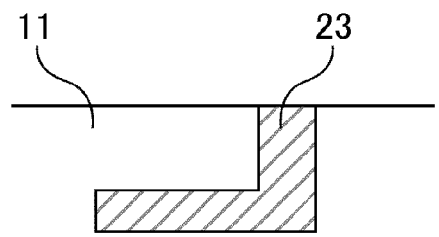
FIG. 31 shows an example of TFT in which the size of the overlapping area of the gate bus line and the drain electrode is adjusted in the example of TFT shown in FIG. 25, and shows a form in which the dimension d3 of the TFT shown in FIG. 25 is changed.
Figure 32:
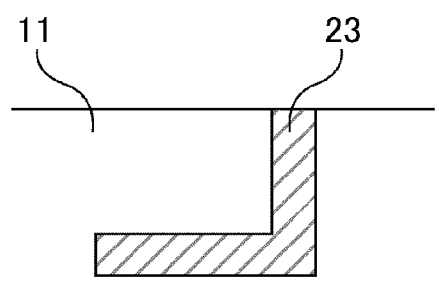
FIG. 32 shows an example of TFT in which the size of the overlapping area of the gate bus line and the drain electrode is adjusted in the example of TFT shown in FIG. 25, and shows a form in which the dimension d4 of the TFT shown in FIG. 25 is changed.
Figure 33:
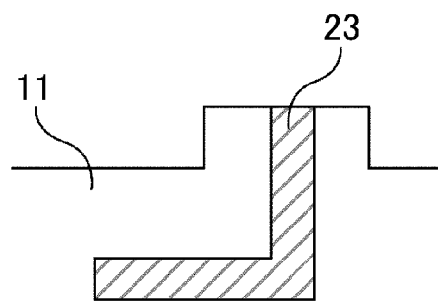
FIG. 33 shows an example of TFT in which the size of the overlapping area of the gate bus line and the drain electrode is adjusted in the example of TFT shown in FIG. 25, and shows a form in which the dimension d4 of the TFT shown in FIG. 25 is changed.

Each of FIG. 31 to FIG. 33 shows an example of TFT in which the size of the overlapping area of the gate bus line and the drain electrode is adjusted in the example of TFT shown in FIG. 25. FIG. 31 shows a form in which the dimension d3 of the TFT shown in FIG. 25 is changed. In FIG. 31, the width d3 as a whole is increased. Each of FIG. 32 and FIG. 33 shows a form in which the dimension d4 of the TFT shown in FIG. 25 is changed. In FIG. 32, the length of d4 is increased. In FIG. 33, the shape of the drain electrode 23 is maintained as it is, but a projecting section is provided in a planar shape in a part of the gate bus line 11, so that the overlapping region of the drain electrode 23 and the gate bus line 11 is increased.

The gate-drain capacitance (Cgd) formed between the gate bus line and the drain electrode is also formed in the region in which the gate bus line and the pixel electrode directly overlap each other. Since, as the overlapping area of the gate bus line and the pixel electrode is increased, the value of the gate-drain capacitance (Cgd) is increased, the balance between the values of α of the picture elements can be adjusted also by adjusting the overlapping area of the gate bus line and the pixel electrode.

Figure 34:
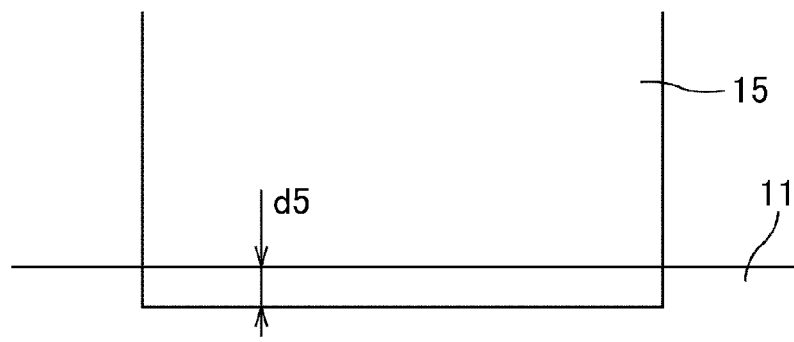
FIG. 34 is a schematic plan view showing a region in which the gate bus line and the pixel electrode overlap each other in Embodiment 1, and showing a form in which a normal gate bus line and a normal pixel electrode overlap each other.
Figure 35:
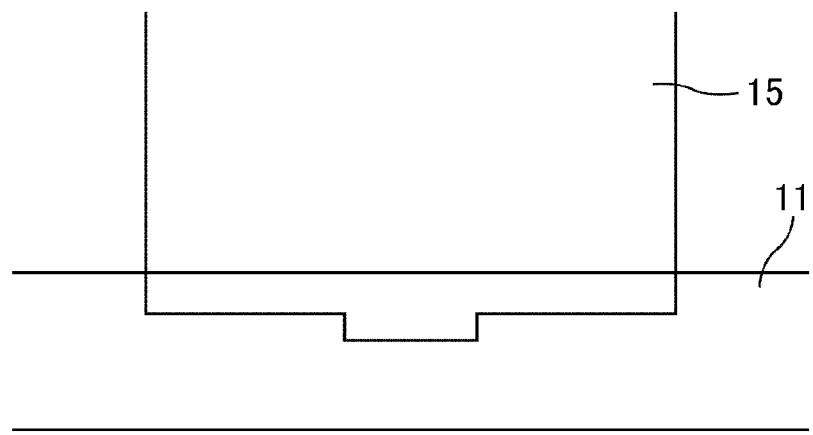
FIG. 35 is a schematic plan view showing a region in which the gate bus line and the pixel electrode overlap each other in Embodiment 1, and showing an example in which the size of the overlapping area of the gate bus line and the drain electrode is adjusted.
Figure 36:
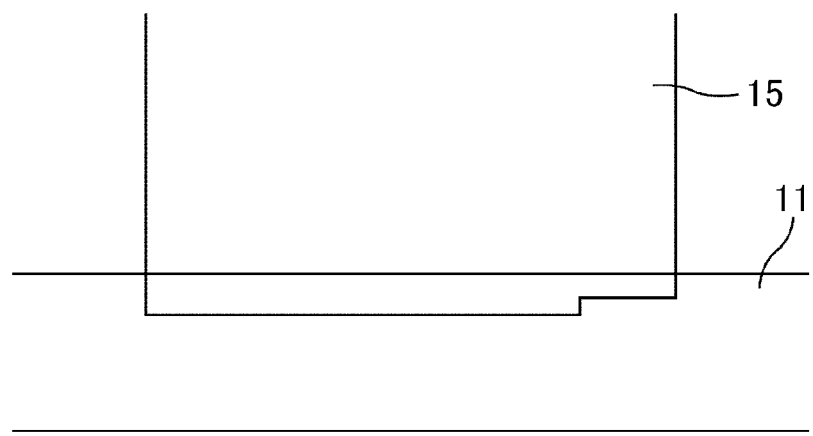
FIG. 36 is a schematic plan view showing a region in which the gate bus line and the pixel electrode overlap each other in Embodiment 1, and showing an example in which the size of the overlapping area of the gate bus line and the drain electrode is adjusted.

Each of FIG. 34 to FIG. 36 is a schematic plan view showing a region in which the gate bus line and the pixel electrode overlap each other in Embodiment 1. FIG. 34 shows a form in which a normal gate bus line and a normal pixel electrode overlap each other, and in which the end portion of the pixel electrode 15 is linearly formed, and the gate bus line 11 is extended in parallel with the end portion of the pixel electrode 15. Each of FIG. 35 and FIG. 36 shows an example in which the size of the overlapping area of the gate bus line and the drain electrode is adjusted. In FIG. 35, a projecting section is provided in a planar shape in a part of the pixel electrode 15 in the overlapping region of the pixel electrode 15 and the gate bus line 11. Therefore, as a result, the overlapping region of the pixel electrode 15 and the gate bus line 11 is expanded. In FIG. 36, a recessed section (cut-out section) is provided in a planar shape in a part of the pixel electrode 15 in the overlapping region of the pixel electrode 15 and the gate bus line 11. Therefore, as a result, the overlapping region of the pixel electrode 15 and the gate bus line 11 is narrowed.

In this way, when the overlapping area of the drain electrode and the gate bus line, and the overlapping area of the pixel electrode and the gate bus line are adjusted, the value of each electrostatic capacitance formed in association with the pixel electrode can be adjusted for each of the picture elements, and thereby the value of the opposed voltage can be more optimized for each of the picture elements.

In the following, there are shown the results obtained when a relationship of the overlapping area of the gate bus line and the drain electrode, with the deviation between the values of α of three color picture elements having different picture element pitches was actually investigated in the examples in which the overlapping area of the gate bus line and the drain electrode was made different between the picture elements. Note that, in the investigation described below, the adjustment based on the difference in the channel width is not included, and only the adjustment based on the gate-drain area is included.

In the case where the pitch widths of the three picture elements were set as "red">"green=blue", the deviation between the values of α of the three color picture elements could be suppressed to 2.92% by adjusting the values of a to e between the respective picture elements as shown in Table 4 described below. Further, the value of ΔVd of the red picture element was 1.194 V, and the value of ΔVd of the green and blue picture elements was 1.230 V, and hence the difference between the maximum and minimum values of ΔVd was 36 mV. Therefore, with the above-described design, the optimum opposed voltage was sufficiently adjusted between the picture elements, and hence it was possible to obtain a liquid crystal display device capable of suppressing the generation of image sticking. Note that the ratio of the pitch width of the red, green and blue picture elements was set as "red":"green":"blue"=1:1:0.86.

TABLE 4

|   | Picture element R (μm) | Picture elements G and B (μm) |
|---|---|---|
| a | 14.25 | 14.25 |
| b | 14.0 | 9.5 |
| c | 4.5 | 4.5 |
| d | 4.0 | 4.0 |
| e | 4.0 | 4.0 |

Figure 37:
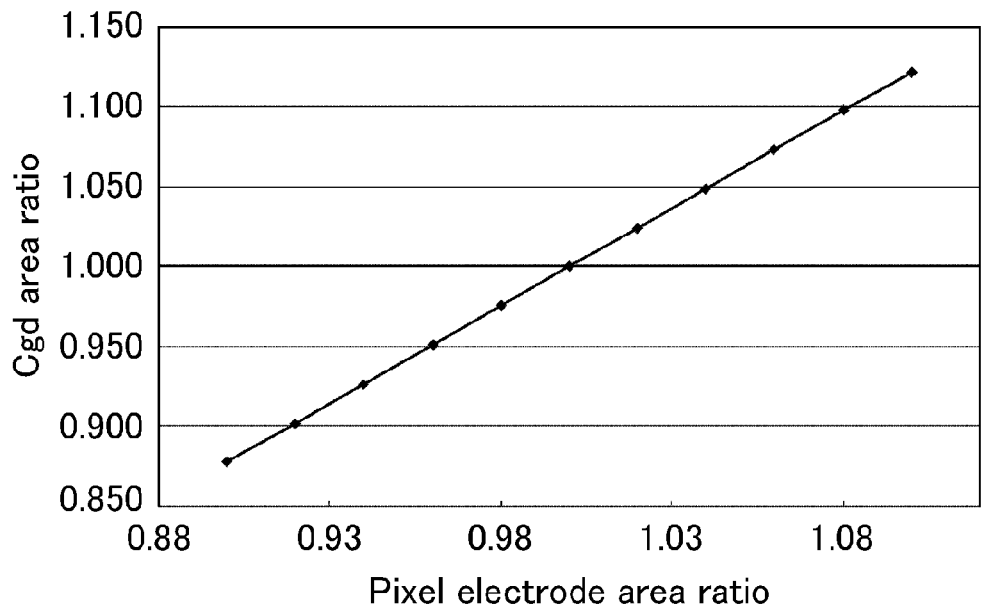
FIG. 37 is a graph showing a relationship between the gate-drain overlapping area ratio and the pixel electrode area ratio.

When the relationship between the gate-drain overlapping area and the pixel electrode area was further investigated, data as shown in Table 5 and FIG. 37 were obtained. FIG. 37 is a graph showing a relationship between the gate-drain overlapping area ratio and the pixel electrode area ratio.

TABLE 5

| Cgd area ratio | Pixel electrode area ratio |
|---|---|
| 0.878 | 0.9 |
| 0.902 | 0.92 |
| 0.927 | 0.94 |
| 0.951 | 0.96 |
| 0.976 | 0.98 |
| 1.000 | 1 |
| 1.024 | 1.02 |
| 1.049 | 1.04 |
| 1.073 | 1.06 |
| 1.098 | 1.08 |
| 1.122 | 1.1 |

The variation between the values of α of the picture elements is suppressed by changing the values of a to e of the TFT channel according to Table 5 and along the straight line shown FIG. 37, and thereby a liquid crystal display device with little image sticking can be obtained.

The deviation between the optimum opposed voltages of the picture elements can be more appropriately reduced in such a manner that the optimum opposed voltages are roughly adjusted on the basis of the relationship between the channel size ratio and the pixel electrode area ratio and are further adjusted on the basis of the relationship between the Cgd area ratio and the pixel electrode area ratio.

In Embodiment 1, it is preferred that the value of "Cpix (min)/Cpix(max)" (hereinafter also referred to as response coefficient) is set to be the same between the picture elements. Reference character Cpix(min) denotes pixel capacitance at the time of black display, and reference character Cpix(max) denotes pixel capacitance at the time of white display. The response coefficient denoted as "Cpix(min)/Cpix(max)" is one of the indicators of the response characteristics of liquid crystal. When the values of the response coefficient are different between the picture elements, the response characteristic becomes different for each of the colors, and hence desired chromaticness may not be obtained.

The response coefficient "Cpix(min)/Cpix(max)" can be adjusted by performing, as described above, the adjustment of the TFT channel width, the adjustment of the overlapping area of the gate bus line and the drain electrode, the adjustment of the overlapping area of the pixel electrode and the gate bus line, the adjustment of the overlapping area of the pixel electrode and the Cs bus line, and the like.

Figure 38:
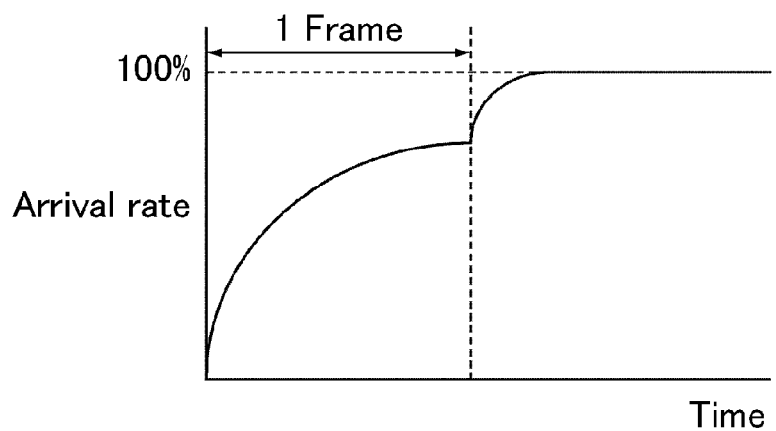
FIG. 38 is a graph showing a relationship between the frame period and the applied voltage arrival rate.
Figure 39:
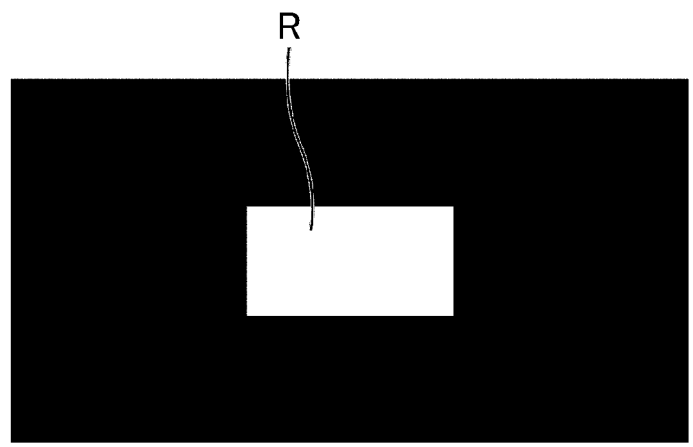
FIG. 39 is a schematic view showing a display state when the influence of the difference in the response coefficient on the display was investigated.

FIG. 38 is a graph showing a relationship between the frame period and the applied voltage arrival rate. FIG. 39 is a schematic view showing a display state when the influence of the difference in the response coefficient on the display was investigated. As shown in FIG. 38, in a liquid crystal display device currently in use, the liquid crystal cannot respond within one frame, and hence the liquid crystal display device is designed to obtain desired transmissivity through two stages. For example, as shown in FIG. 39, when a display is performed such that a white quadrangle is displayed on the black background and then the white quadrangle is moved from the right to the left, the picture elements located at the left end of the quadrangle are made to newly respond in each frame. As a result, only the picture element having a small response coefficient is slow in response, and thereby the intensity of the colors of the other picture elements becomes large so that the chromaticness is changed.

Figure 40:
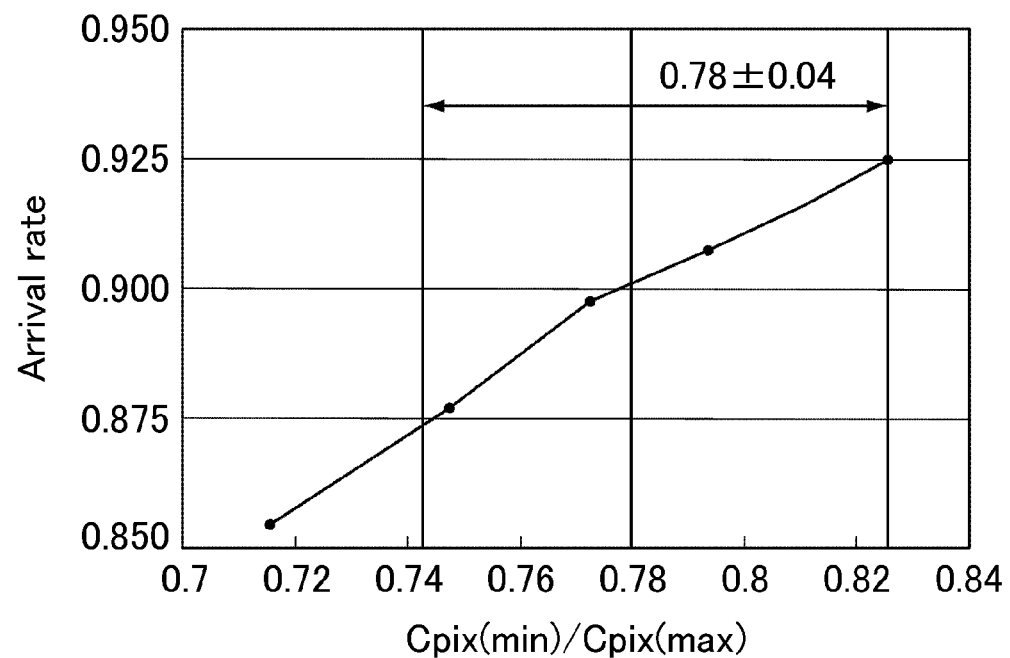
FIG. 40 is a graph showing a suitable range of the response coefficient expressed by "Cpix(min)/Cpix(max)."

To cope with this, the change in the chromaticness can be suppressed by making the values of response coefficients of the picture elements close to each other. FIG. 40 is a graph showing a suitable range of the response coefficient expressed by "Cpix(min)/Cpix(max)." The value of the response coefficient at the time when the arrival rate is 0.9 is 0.78, and the preferred range of the response coefficient is in a range of 0.78±0.04 in which the arrival rate difference is within 5%.

Embodiment 2

Figure 41:
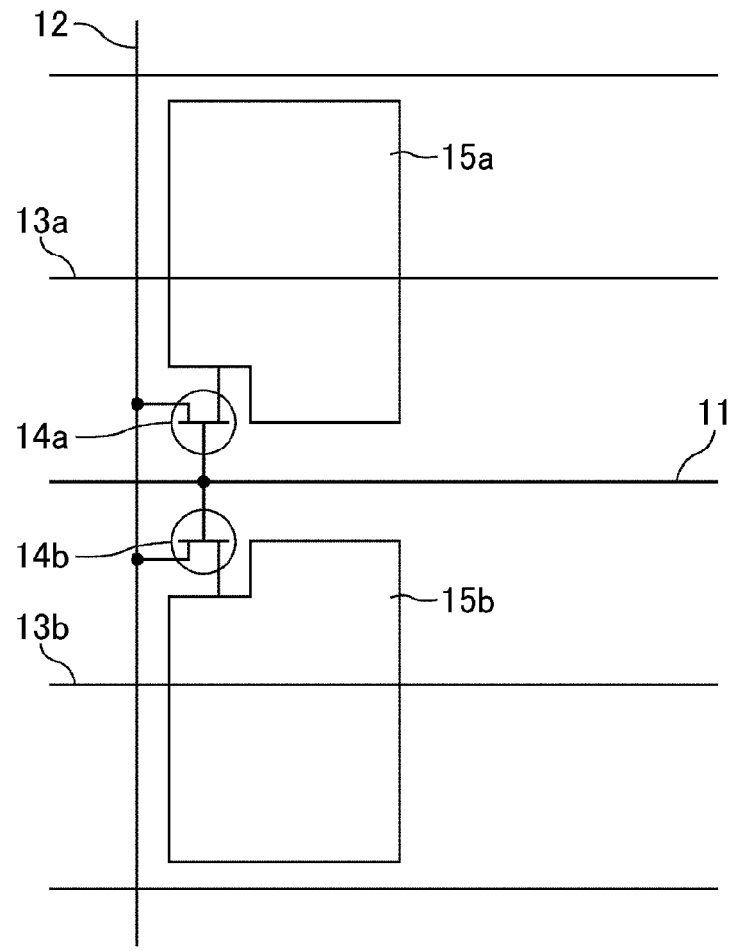
FIG. 41 is a schematic plan view showing an arrangement configuration of pixel electrodes, TFTs and various lines of a liquid crystal display device of Embodiment 2.

FIG. 41 is a schematic plan view showing an arrangement configuration of pixel electrodes, TFTs, and various lines of a liquid crystal display device of Embodiment 2. As shown in FIG. 41, in Embodiment 2, two pixel electrodes (hereinafter also referred to as sub-pixel electrodes) are arranged for one picture element. Further, one pixel is configured by a plurality of picture elements, and each of the picture elements is individually controlled to control each pixel and to further control the whole display of the liquid crystal display device.

The liquid crystal display device of Embodiment 2 includes the gate bus line 11 extended in the row direction (lateral direction), and the source bus line 12 extended in the column direction (longitudinal direction). Further, the liquid crystal display device includes a first TFT 14a and a second TFT 14b each of which are connected to both the gate bus line 11 and the source bus line 12. The first TFT 14a is connected to a first sub-pixel electrode 15a, and the second TFT 14b is connected to a second sub-pixel electrode 15b. Further, the liquid crystal display device of Embodiment 2 includes a first Cs bus line 13a which overlaps at least a part of the first sub-pixel electrode 15a, and a second Cs bus line 13b which overlaps at least a part of the second sub-pixel electrode 15b. As shown in FIG. 41, each of the first Cs bus line 13a and the second Cs bus line 13b is extended in the row direction so as to cross the center of each of the sub-pixel electrodes 15a and 15b.

In Embodiment 2, a kind of color filter is arranged for one picture element. Examples of the kinds, the number and the arrangement order of colors of the picture elements configuring a pixel include, but are not limited in particular to, combinations, such as RGB, RGBY and RGBW. The color of a picture element is determined by a color filter. Examples of arrangement forms of color filters include a stripe arrangement, as shown in FIG. 2, in which color filters are formed to be extended in the longitudinal direction regardless of the boundary of the pixel electrode, and a two-by-two matrix arrangement, as shown in FIG. 3, in which two of four color filters are arranged in each of the row direction and the column direction.

In Embodiment 2, each of the two sub-pixel electrodes forms sub-pixel capacitance having a different capacitance value. Examples of the method for making the sub-pixel capacitance different for each of the sub-pixel electrodes include (1) a method of supplying a signal voltage from each of different source bus lines, and (2) a method of adjusting the signal voltage by changing the voltage of the Cs bus line. The TFTs are connected to the sub-pixel electrodes respectively. Each of the TFTs is connected to the same gate bus line, and hence the two sub-pixels are simultaneously controlled at the timing at which a scanning signal is supplied to the gate bus line.

Figure 42:
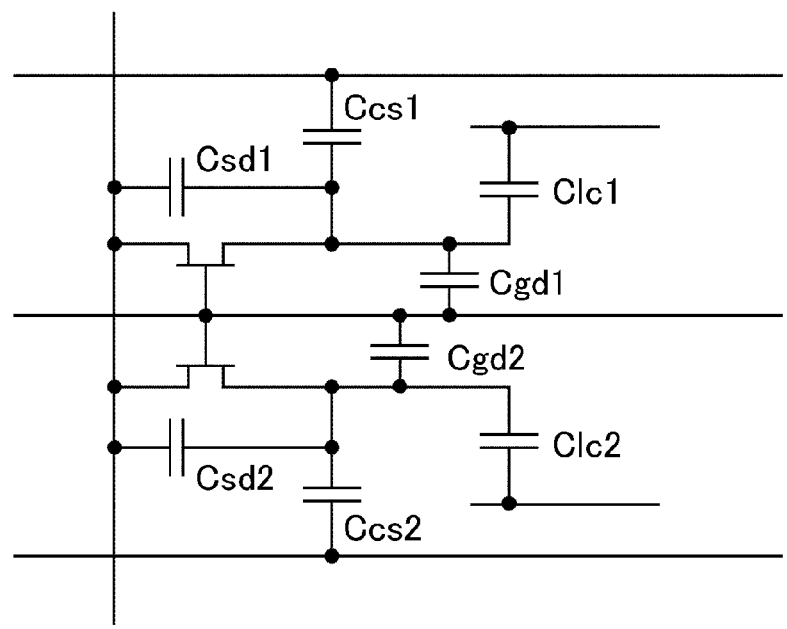
FIG. 42 is an equivalent circuit diagram in the liquid crystal display device of Embodiment 2.

FIG. 42 is an equivalent circuit diagram in the liquid crystal display device of Embodiment 2. In Embodiment 2, a circuit pattern is formed for each of the sub-pixels, and the circuit patterns of the two sub-pixels are shown in FIG. 42. The sub-pixel electrodes respectively form Clc1 and Clc2 between themselves and the opposed electrode via the liquid crystal layer. The sub-pixel electrodes respectively form Ccs1 and Ccs2b between themselves and the Cs bus line. Further, each of the sub-pixel electrodes is connected to the drain electrode of each of the TFTs, and the driving of each of the sub-pixels is controlled by each of the TFTs.

The liquid crystal capacitance Clc is formed by the pixel electrode and the opposed electrode which are arranged to face each other via the liquid crystal layer. The value of Clc is dependent on the effective voltage (V) applied to the liquid crystal layer by the pair of electrodes. The storage capacitance Ccs is formed by the pixel electrode and the Cs bus line (storage capacitor line) which are arranged to face each other via an insulating layer. The gate-drain capacitance Cgd is formed by the pixel electrode and the gate bus line (scanning line) which are arranged to face each other via an insulating layer. The source-drain capacitance Csd is formed by the pixel electrode and the source bus line (signal line) which are arranged to face each other via an insulating layer.

The method for driving each of the sub-pixel electrodes by using the TFTs, and the basic configuration in Embodiment 2 are the same as those in Embodiment 1.

Figure 43:
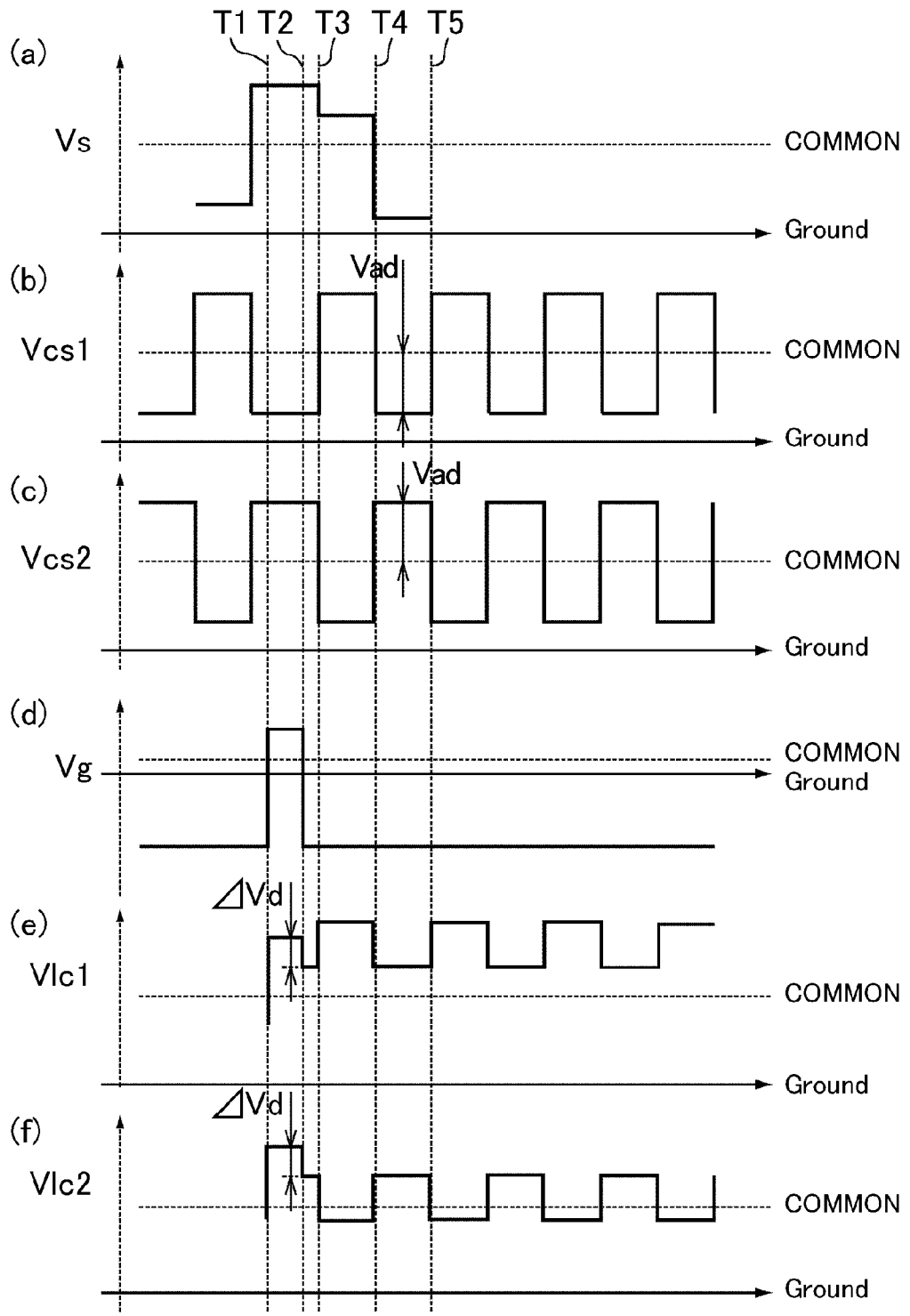
FIG. 43 shows signal waveforms when a multi-pixel drive is performed.

In the following, a method for performing the multi-pixel drive by changing the voltage of the Cs bus line will be described in detail. FIG. 43 shows signal waveforms when the multi-pixel drive is performed.

When a voltage Vg is changed from VgL to VgH at the time of T1, the first TFT 14a and the second TFT 14b are simultaneously switched to conductive state (on-state), so that a voltage Vs is transmitted to each of the first and second sub-pixel electrodes 15a and 15b from the source bus line 12, and is charged to the first and second sub-pixel electrodes 15a and 15b. Similarly, the first and second Cs bus lines 13a and 13b respectively overlapping the first and second sub-pixel electrodes 15a and 15b are also charged by the voltage supplied from the source bus line 12.

Next, when the voltage Vg of the gate bus line 11 is changed from VgH to VgL at the time of T2, the first TFT 14a and the second TFT 14b are simultaneously switched to non-conductive state (off-state), the first and second sub-pixel electrodes 15a and 15b, and the first and second Cs bus lines 13a and 13b are all electrically insulated from the source bus line 12. Note that, immediately after this change, each of the voltages Vlc1 and Vlc2 of the first and second sub-pixel electrodes 15a and 15b is reduced by substantially a same voltage ΔVd as follows, due to the pull-in phenomenon caused by the influence of the parasitic capacitance, and the like, associated with the first TFT 14a and the second TFT 14b.

$$Vlc1 = Vs - \Delta Vd$$

$$Vlc2 = Vs - \Delta Vd$$

Further, at this time, the voltage Vcs1 and Vcs2 of the first and second Cs bus lines 13a and 13b become as follows.

$$Vcs1 = Vcom - Vad$$

$$Vcs2 = Vcom + Vad$$

At the time of T3, the voltage Vcs1 of the first Cs bus line 13a is changed from Vcom−Vad to Vcom+Vad, and the voltage Vcs2 of the second Cs bus line 13b is changed from Vcom+Vad to Vcom−Vad. According to these voltage changes in the first Cs bus line 13a and the second Cs bus line 13b, the voltages Vlc1 and Vlc2 of the first and second sub-pixel electrodes 15a and 15b are changed as follows.

$$Vlc1 = Vs - \Delta Vd + 2 \times Vad \times Ccs1/(Clc1 + Ccs1)$$

$$Vlc2 = Vs - \Delta Vd - 2 \times Vad \times Ccs2/(Clc2 + Ccs2)$$

At the time of T4, Vcs1 is changed from Vcom+Vad to Vcom−Vad, and Vcs2 is changed from Vcom−Vad to Vcom+Vad. Before the time T4, the voltages Vlc1 and Vlc2 are respectively expressed as follows.

$$Vlc1 = Vs - \Delta Vd + 2 \times Vad \times Ccs1/(Clc1 + Ccs1)$$

$$Vlc2 = Vs - \Delta Vd - 2 \times Vad \times Ccs2/(Clc2 + Ccs2)$$

At the time of T4, also, the voltages Vlc1 and Vlc2 are respectively changed to the voltages expressed as follows.

$$Vlc1 = Vs - \Delta Vd$$

$$Vlc2 = Vs - \Delta Vd$$

At the time of T5, Vcs1 is changed from Vcom−Vad to Vcom+Vad, and Vcs2 is changed from Vcom+Vad to Vcom−Vad. Before the time of T5, the voltages Vlc1 and Vlc2 expressed as follows.

$$Vlc1 = Vs - \Delta Vd$$

$$Vlc2 = Vs - \Delta Vd$$

At the time of T5, also, the voltages Vlc1 and Vlc2 are respectively changed to the voltages expressed as follows $$Vlc1 = Vs - \Delta Vd + 2 \times Vad \times Ccs1/(Clc1 + Ccs1)$$

$$Vlc2 = Vs - \Delta Vd - 2 \times Vad \times Ccs2/(Clc2 + Ccs2)$$

For each interval of an integer multiple of horizontal writing time 1H, the voltages Vcs1, Vcs2, Vlc1, and Vlc2 respectively repeat the changes caused at the time of T4 and T5. Whether the repeating interval of the changes caused at the time of T4 and T5 is set to be equal to the horizontal writing time 1H, or set to twice, 3 times, or more of the horizontal writing time 1H, may be suitably determined in view of the driving method (for example, polarity inversion drive) and displaying conditions (flickering, roughness of display, and the like) of the liquid crystal display device. This repetition is continued until the time equivalent to T1 is subsequently reached. Therefore, the effective values of voltages Vlca and Vlcb of the sub-pixel electrodes become as follows, respectively.

$$Vlca = Vs - \Delta Vd + Vad \times Ccs1/(Clc1 + Ccs1)$$

$$Vlcb = Vs - \Delta Vd - Vad \times Ccs2/(Clc2 + Ccs2)$$

Therefore, the effective voltages V1 and V2, which are respectively applied to the liquid crystal layer by the first and second sub-pixel electrodes 15a and 15b, are set to values different from each other and expressed as follows.

$$V1 = Vlc1 - Vcom$$

$$V2 = Vlc2 - Vcom$$

That is, the effective voltages V1 and V2 are expressed as follows.

$$V1 = Vs - \Delta Vd + Vad \times Ccs1/(Clc1 + Ccs1) - Vcom$$

$$V2 = Vs - \Delta Vd - Vad \times Ccs2/(Clc2 + Ccs2) - Vcom$$

Under the above-described premises, the adjustment of the optimum opposed voltages between the respective picture elements in Embodiment 2 will be described in detail below.

The plurality of sub-pixel electrodes of the red, green and blue picture elements are formed to have the same total longitudinal length, while the lateral lengths of the sub-pixel electrodes are different from each other. For this reason, the difference in the picture element pitch is reflected, as it is, in the difference in the total area of the sub-pixel electrode between the picture elements.

In Embodiment 2, similarly to Embodiment 1, the balance between the values of α=Cgd/(Cgd+Csd+Ccs+Clc) of the picture elements is adjusted by using the channel width of TFT. Further, the balance between the values of α=Cgd/(Cgd+Csd+Ccs+Clc) of the picture elements is also supplementarily adjusted by using the gate-drain overlapping area. As the methods for adjusting the balance between the values of α in Embodiment 2, methods similar to the methods described in Embodiment 1 can be used.

In Embodiment 2, it is preferred that K-values are set to be equal to each other between the sub-pixels. When the K-values are set to be equal to each other, the values of the electrostatic capacitance formed by the respective sub-pixel electrodes are made uniform, and the adjustment between the sub-pixels is more suitably performed. Thereby, it is possible to further reduce the possibility that the value of α is varied between the picture elements. The K-value is expressed as K=Ccs/Cpix(Cgd+Csd+Ccs+Clc). Therefore, the adjustment of Ccs is effective to adjust the balance between the K-values of the picture elements.

Figure 44:
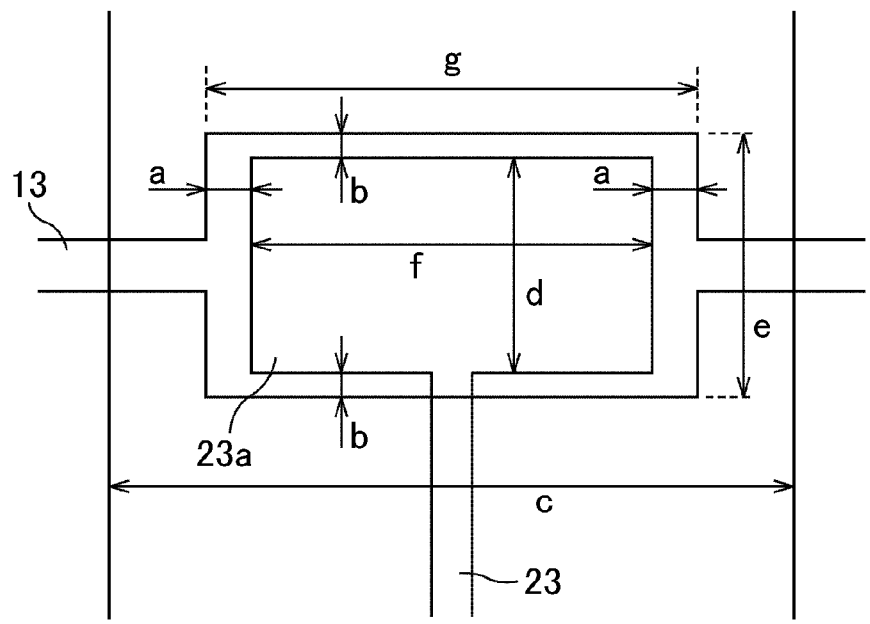
FIG. 44 is a schematic plan view showing a range in which the Cs bus line and the drain electrode having an expanded region in a part overlap each other in Embodiment 2.

FIG. 44 is a schematic plan view showing a range in which the expanded portions of the Cs bus line and of the drain electrode overlap each other in Embodiment 2. As shown in FIG. 44, the Cs bus line 13 has an expanded region in a part thereof, and the drain electrode 23 also has an expanded region in a part thereof. These expanded regions are isolated from each other via an insulating layer, but overlap each other in plan view so as to form the storage capacitance Ccs. The value of storage capacitance Ccs depends on the overlapping area of these expanded regions, and hence the storage capacitance Ccs having a suitable capacitance value can be formed by adjusting the size of the expanded region for each of the sub-pixels and by adjusting the overlapping degree between the expanded regions. Note that, in FIG. 44, the expanded portion 23a of the Cs bus line 13 is larger than the expanded portion of the drain electrode 23 on both longitudinal and lateral sides.

The longitudinal length and the lateral length of the expanded portion 23a of the drain electrode 23 are denoted by reference characters of d and f, respectively. Further, the longitudinal length and the lateral length of the expanded portion of the Cs bus line 13 are denoted by reference characters of e and g, respectively.

On the same one side of the expanded portions, the distance between the longitudinal side of the expanded portion of the Cs bus line 13 and the longitudinal side of the expanded portion 23a of the drain electrode 23 is set to a. That is, the expanded portion 23a of the drain electrode 23 is formed on the laterally inner side of the expanded portion of the Cs bus line 13 by the distance a from each of the longitudinal sides of the expanded portion of the Cs bus line 13. Therefore, the expression g=f+2a is established.

On the same one side of the expanded portions, the distance between the lateral side of the expanded portion of the Cs bus line 13 and the lateral side of the expanded portion 23a of the drain electrode 23 is set to b. That is, the expanded portion 23a of the drain electrode 23 is formed on the longitudinally inner side of the expanded portion of the Cs bus line 13 by the distance b from each of the lateral sides of the expanded portion of the Cs bus line 13. Therefore, the expression e=d+2b is established.

In such case, when, in the four color picture elements having different pitch widths, the pitch widths were set as "red=blue">"green=yellow", the deviation between the K-values (maximum value–minimum value) of the picture elements could be suppressed to 0.10% by respectively adjusting the values of a to g between the picture elements as shown in Table 6 described below. Note that the ratio of the pitch widths of the respective picture elements was set as "red":"blue":"green":"yellow"=1:1:1.4:1.4.

TABLE 6

|   | Picture elements R and B (μm) | Picture elements G and Y (μm) |
|---|---|---|
| a | 17.0 | 14.0 |
| b | 3.0 | 2.0 |
| c | 226.0 | 154.25 |
| d | 29.0 | 36.0 |
| e | 35.0 | 40.0 |
| f | 157.0 | 91.25 |
| g | 191.0 | 119.25 |

Figure 45:
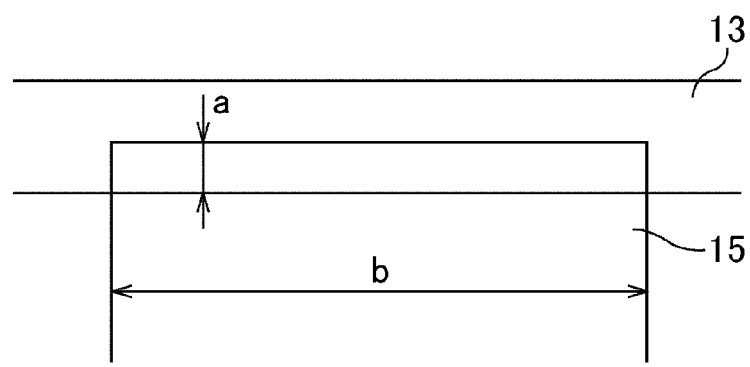
FIG. 45 is a schematic plan view showing an example when the Cs capacitance is adjusted by the overlapping area of the pixel electrode and the Cs bus line.
Figure 46:
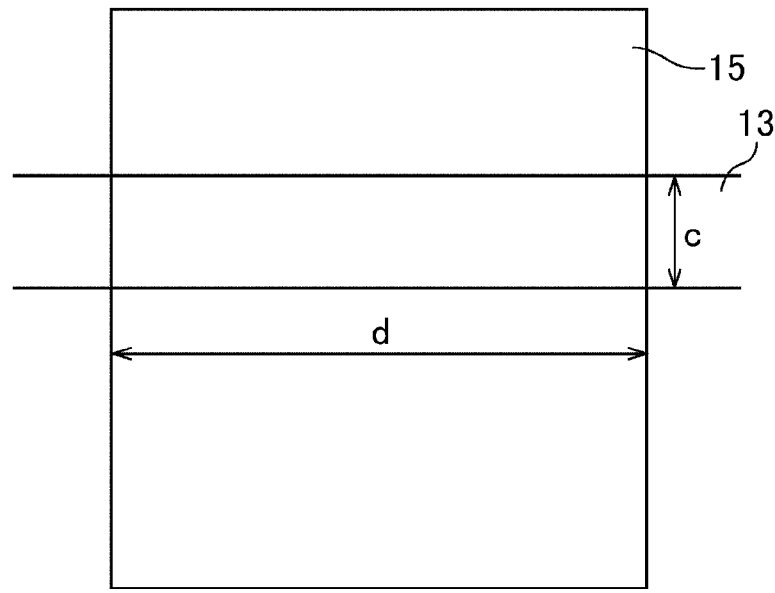
FIG. 46 is a schematic plan view showing an example when the Cs capacitance is adjusted by the overlapping area of the pixel electrode and the Cs bus line.
Figure 47:
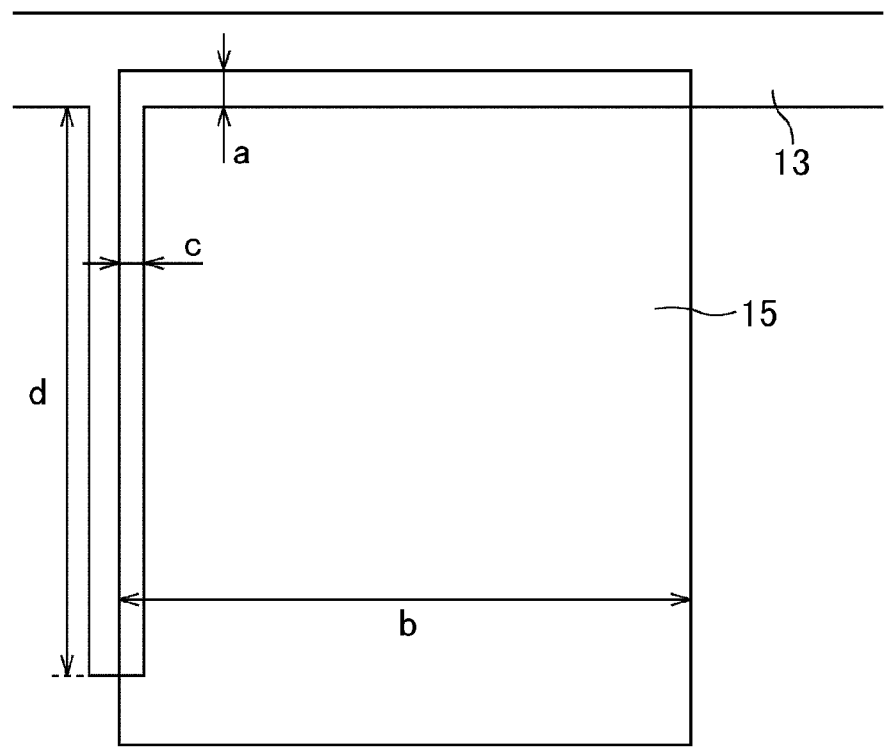
FIG. 47 is a schematic plan view showing an example when the Cs capacitance is adjusted by the overlapping area of the pixel electrode and the Cs bus line.
Figure 48:
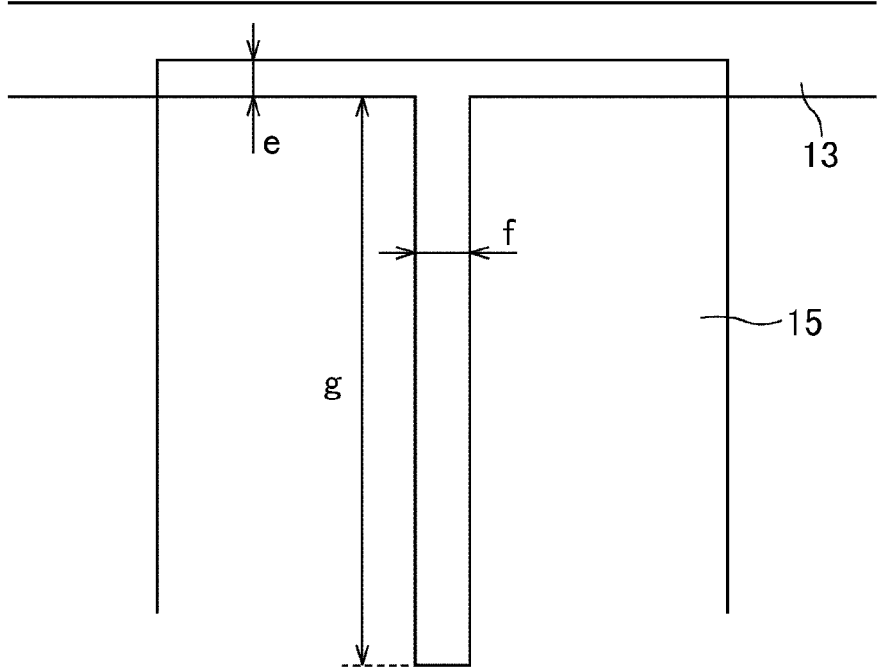
FIG. 48 is a schematic plan view showing an example when the Cs capacitance is adjusted by the overlapping area of the pixel electrode and the Cs bus line.

Each of FIG. 45 to FIG. 48 is a schematic plan view showing an example when the storage capacitance Cs is adjusted by the overlapping area of the pixel electrode and the Cs bus line. FIG. 45 shows a form in which the upper side of the pixel electrode 15 overlaps a part of the Cs bus line 13. The value of the storage capacitance Ccs can be adjusted by adjusting the values of a and b in FIG. 45. FIG. 46 shows a form in which the Cs bus line 13 crosses the center of the pixel electrode 15, and in which the whole in the width direction of the Cs bus line 13 overlaps the pixel electrode 15. The value of the storage capacitance Ccs can be adjusted by adjusting the values of c and d in FIG. 46. FIG. 47 shows a form in which the upper side of the pixel electrode 15 overlaps the Cs bus line 13, and in which an extending section of the Cs bus line 13 is added along with the left side of the pixel electrode 15. The value of the storage capacitance Ccs can be adjusted by adjusting the values of a to d in FIG. 47. FIG. 48 shows a form in which the upper side of the pixel electrode 15 overlaps the Cs bus line 13, and in which an extending section of the Cs bus line 13 is added so as to cross the center of the pixel electrode 15. The value of Ccs can be adjusted by adjusting the values of e to f in FIG. 48.

The values of the storage capacitance Ccs between the sub-pixels are made close to each other by performing these adjustments between the sub-pixels, so that the K-values within a suitable range can be obtained.

Figure 49:
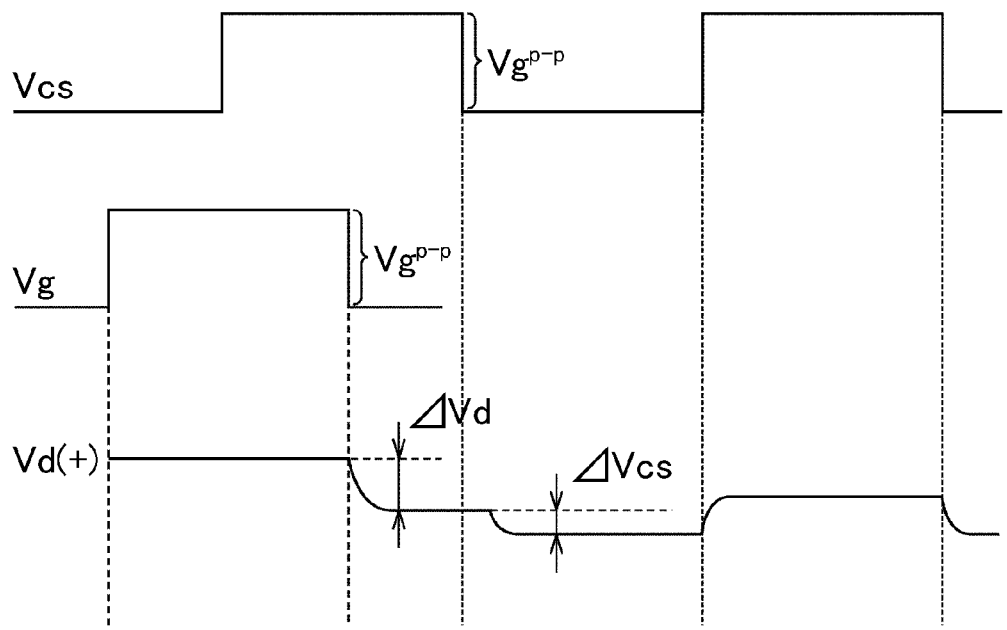
FIG. 49 is a waveform chart showing the Cs amplitude when a multi-drive is performed.

FIG. 49 is a waveform chart showing the amplitude of the voltage of the CS bus line 13 when the multi-drive is performed. The voltage value ΔVcs in FIG. 49 is expressed as $\Delta Vcs = K \times Vcs^{p-p}$. It is preferred that the magnitude of the pull-in voltage is uniform between the sub-pixels and specifically is 10 mV or less. Thereby, the optimum opposed voltages of the sub-pixels can be made close to each other. Since the value of $Vcs^{p-p}$ is substantially fixed, it is preferred that the value of ΔVcs is adjusted by adjusting the value of K.

Table 7 described below is a table showing a permissible range of deviation of the value of K when the value of ΔVcs is assumed to be 10 mV or less. In the conventional liquid crystal display device in which the areas of the picture elements are not made different from each other, the value of K is set in the range of 0.43 to 0.54, and hence the investigation was performed on the basis of this range.

TABLE 7

| K | Deviation of K (%) | Vcs | ΔVcs | Deviation of ΔVcs (mV) |
|---|---|---|---|---|
| 0.54 | 0.74 | 1.92 | 1.04 | 7.7 |
| 0.544 |  | 1.92 | 1.04 |  |
| 0.43 | 0.93 | 2.41 | 1.04 | 9.6 |
| 0.434 |  | 2.41 | 1.04 |  |

As shown in Table 7 described above, when the value of K was set to 0.54 and when the deviation of the value of K was set to 0.74%, the deviation of the value of ΔVcs could be suppressed to 7.7 mV. Further, when the value of K was set to 0.43 and when the deviation of the value of K was set to 0.93%, the deviation of the value of ΔVcs could be suppressed to 9.6 mV. Therefore, the target range of the value of K is 1.0% or less.

Embodiment 3

In Embodiment 3, three color picture elements of red, green and blue, or four color picture elements of red, green, blue and yellow are used, and one pixel is configured by a combination of these picture elements. Note that, in Embodiment 3, the kinds, the number, and the arrangement order of colors of the picture elements are not limited in particular.

Figure 50:
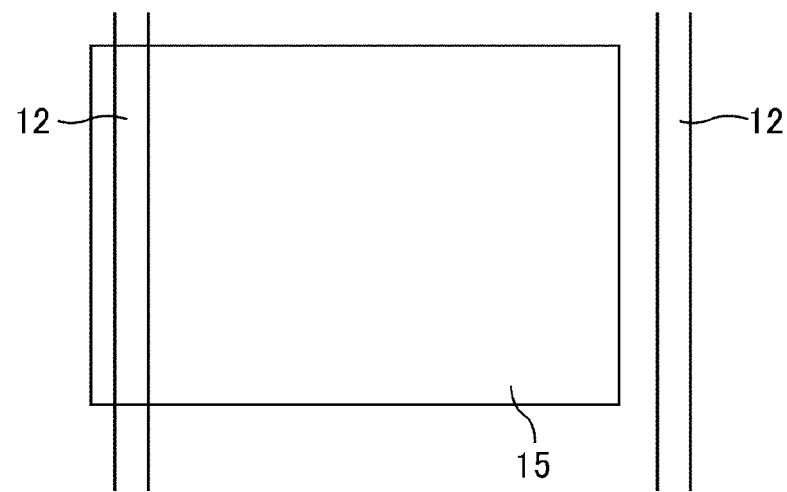
FIG. 50 is a schematic plan view showing an arrangement configuration of pixel electrodes and lines in Embodiment 3.

FIG. 50 is a schematic plan view showing an arrangement configuration of pixel electrodes and lines in Embodiment 3. In the liquid crystal display device of Embodiment 3, both two source bus lines extended in the longitudinal direction respectively overlap end portions of one of a plurality of pixel electrodes arranged in one pixel. On the other hand, as shown in FIG. 50, only one of the two source bus lines 12 extended in the longitudinal direction overlaps the end portion of another pixel electrode 15, and the other source bus line 12 does not overlap the end portion of each of the other pixel electrodes 15.

For example, this configuration is adopted in such a case where a columnar spacer is arranged in the picture element or where the source-drain capacitance Csd is reduced, and where it is necessary that the area of the pixel electrode is reduced and that the source line is made to overlap only one end portion of the pixel electrode. When the area of the pixel electrode is reduced only in one picture element, or when the overlapping state of the source line and the pixel electrode is different for each of the picture elements, the optimum opposed voltage is different for each of the picture elements, and hence the image sticking easily occurs.

To cope with this, in Embodiment 3, the pixel capacitance between the picture elements or between the sub-pixels is adjusted by means similar to the means shown in Embodiment 1 and Embodiment 2. Note that, in Embodiment 3, the pitch widths of the picture elements are not limited in particular, and may be different from each other or may be the same.

Embodiment 4

In Embodiment 4, three color picture elements of red, green and blue, or four color picture elements of red, green, blue and yellow are used, and one pixel is configured by a combination of these picture elements. Note that, in Embodiment 4, the kinds, the number, and the arrangement order of colors of the picture elements are not limited in particular.

Figure 51:
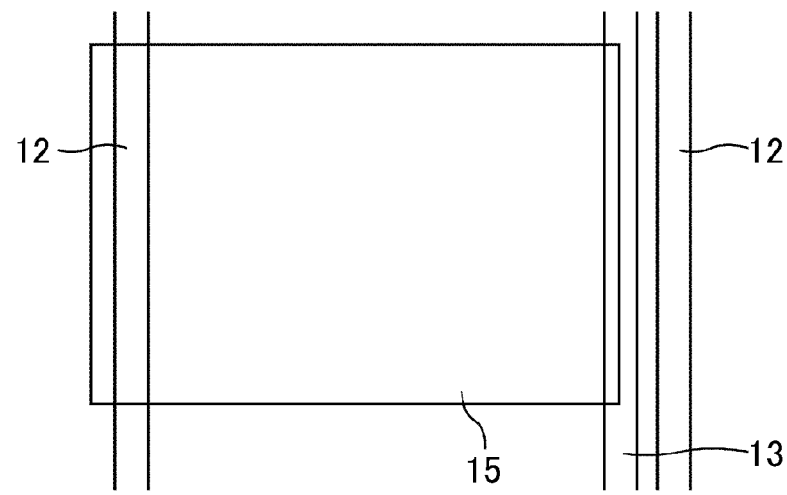
FIG. 51 is a schematic plan view showing an arrangement configuration of pixel electrodes and lines in Embodiment 4.

FIG. 51 is a schematic plan view showing an arrangement configuration of a pixel electrode and lines in Embodiment 4. In the liquid crystal display device of Embodiment 4, both two source lines extended in the longitudinal direction respectively overlap end portions of one of a plurality of pixel electrodes arranged in one pixel. On the other hand, as shown in FIG. 51, only one of the two source bus lines 12 extended in the longitudinal direction overlaps the end portion of another pixel electrode 15, and the other source bus line 12 does not overlap the end portion of each of the pixel electrode 15. Further, next to the source bus line 12 not overlapping the pixel electrode 15, the Cs bus line 13 is extended in the longitudinal direction and overlaps the other end portion of the pixel electrode 15.

For example, this configuration is adopted in such a case where a columnar spacer is arranged in the picture element or where the source-drain capacitance Csd is reduced, and where it is necessary that the area of the pixel electrode is reduced and also the source line is made to overlap only one end portion of the pixel electrode, and that not the source line but only the Cs line is made to overlap the other end portion of the picture element. When the area of the pixel electrode is reduced only in one picture element, or when the overlapping state of the source and Cs lines and the pixel electrode is different for each of the picture elements, the optimum opposed voltage is different for each of the picture elements, and hence the image sticking easily occurs.

To cope with this, in Embodiment 4, the pixel capacitance between the picture elements or between the sub-pixels is adjusted by means similar to the means shown in Embodiment 1 and Embodiment 2. Note that, in Embodiment 4, the pitch widths of the picture elements are not limited in particular, and may be different from each other or may be the same.

Embodiment 5

In Embodiment 5, three color picture elements of red, green and blue, or four color picture elements of red, green, blue and yellow are used, and one pixel is configured by a combination of these picture elements. Note that, in Embodiment 5, the kinds, the number, and the arrangement order of colors of the picture elements are not limited in particular.

Figure 52:
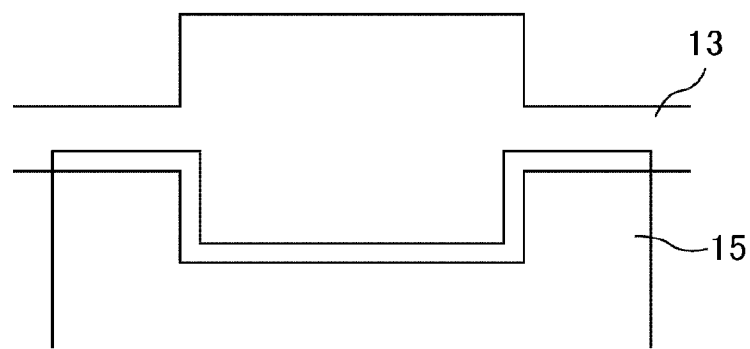
FIG. 52 is a schematic plan view showing an arrangement configuration of pixel electrodes and lines in Embodiment 5.

FIG. 52 is a schematic plan view showing an arrangement configuration of a pixel electrode and lines in Embodiment 5. In the liquid crystal display device of Embodiment 5, the Cs line is extended in the lateral direction so as to overlap the upper end portion of one of a plurality of pixel electrodes arranged in one pixel, and the Cs line is not formed in a linear shape but is formed to have an expanded region in a part thereof. On the other hand, as shown in FIG. 52, the Cs bus line 13 is extended in the lateral direction so as to overlap the upper portion of each of the other pixel electrodes 15. The Cs bus line 13 is not formed in a linear shape but is formed to have an expanded region in a part thereof, while the upper side of the pixel electrode 15 is not formed in a linear shape but is formed to have an inwardly recessed shape. Thereby, the overlapping area of the pixel electrode 15 and the Cs bus line 13 is different for each of the picture elements, and the area of the pixel electrode 15 is also different for each of the picture elements.

For example, in such a case where a columnar spacer is arranged in the picture element or where the storage capacitance Ccs is reduced, when the area of the pixel electrode is reduced and also the arrangement configuration of the pixel electrode and the Cs line is made different for each of the picture elements or when the pixel electrode area is made different for each of the picture elements, the optimum opposed voltage becomes different for each of the picture elements, and hence the image sticking easily occurs.

To cope with this, in Embodiment 5, the pixel capacitance between the picture elements or between the sub-pixels is adjusted by means similar to the means shown in Embodiment 1 and Embodiment 2. Note that, in Embodiment 5, the pitch widths of the picture elements are not limited in particular, and may be different from each other or may be the same.

Embodiment 6

Figure 53:
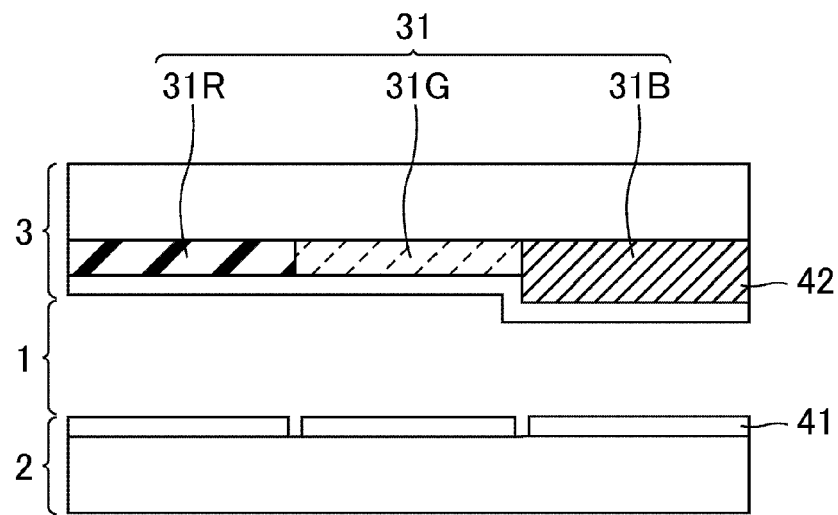
FIG. 53 is a schematic cross-sectional view showing a form in which picture elements of three colors are used in Embodiment 6.
Figure 54:
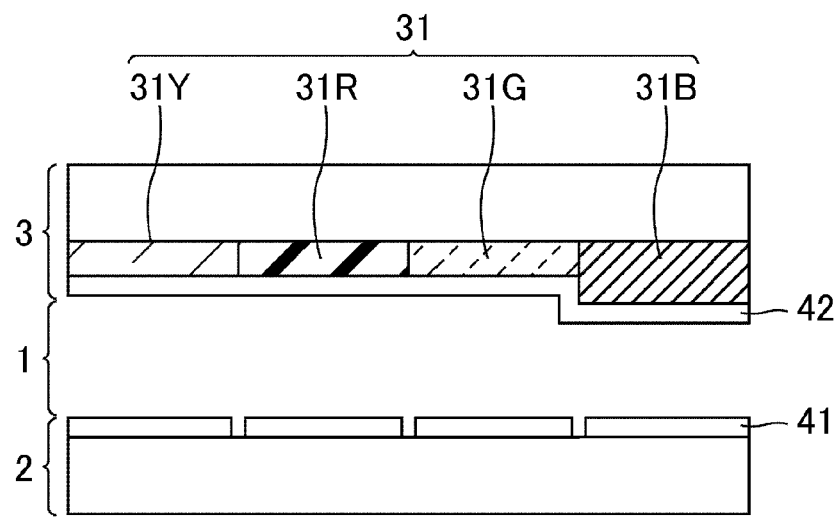
FIG. 54 is a schematic cross-sectional view showing a form in which picture elements of four colors are used in Embodiment 6.
Figure 55:
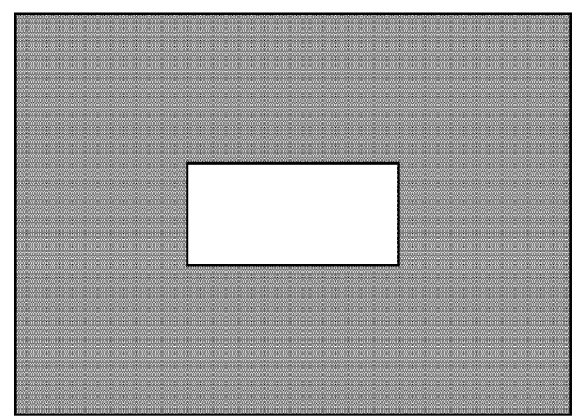
FIG. 55 is a schematic view showing a state in which a white window is displayed on a halftone background.
Figure 56:
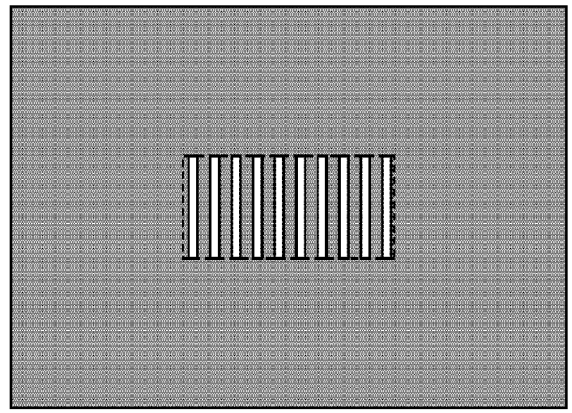
FIG. 56 is a schematic view showing a state of a halftone solid display after the white window is eliminated.
Figure 57:
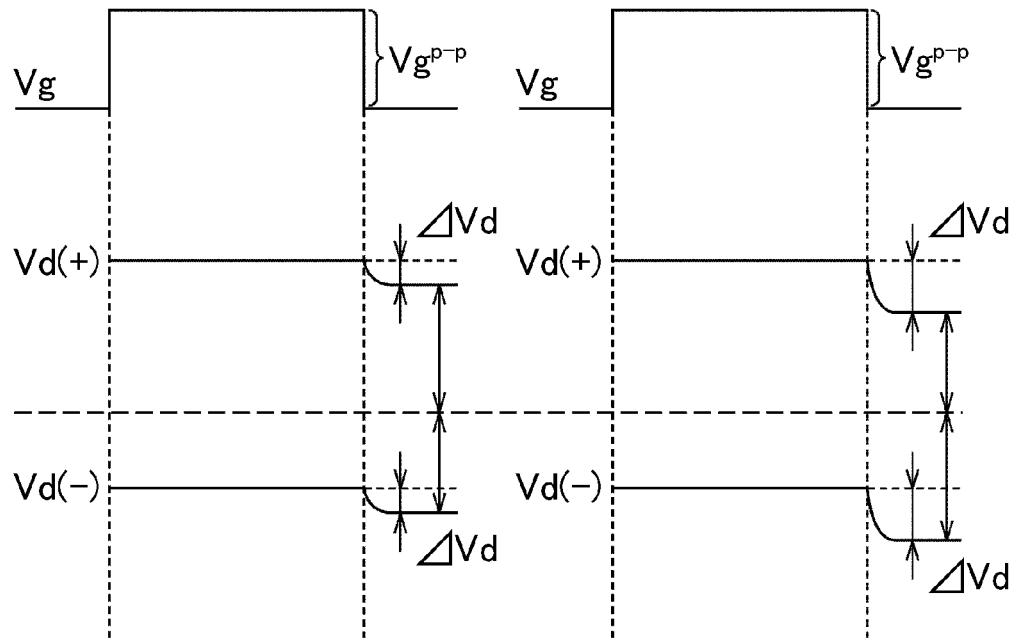
FIG. 57 is a schematic view showing signal waveforms of the drain voltages of two pixel electrodes arranged adjacently to each other.

Each of FIG. 53 and FIG. 54 is a schematic cross-sectional view showing a liquid crystal layer in Embodiment 6. In Embodiment 6, three color picture elements of red, green and blue, or four color picture elements of red, green, blue and yellow are used, and one pixel is configured by a combination of these picture elements. FIG. 53 is a schematic cross-sectional view showing a form in which three color picture elements are used in Embodiment 6, and FIG. 54 is a schematic cross-sectional view showing a form in which four color picture elements are used in Embodiment 6.

As shown in FIG. 53 and FIG. 54, a liquid crystal layer 1 provided in the liquid crystal display device of Embodiment 6 is arranged between a pair of substrates composed of an active matrix substrate 2 and a color filter substrate 3. The active matrix substrate 2 includes pixel electrodes 41, and the color filter substrate 3 includes an opposed electrode 42. Further, the color filter substrate 3 includes a color filter 31 of a plurality of colors, and one pixel is formed of three or four colors. FIG. 53 shows a form in which three color filters of a red color filter 31R, a green color filter 31G, and a blue color filter 31B are used, and FIG. 54 shows a form in which four color filters of a red color filter 31R, a green color filter 31G, a blue color filter 31B, and a yellow filter 31Y are used.

In Embodiment 6, the thickness (cell gap) of the liquid crystal layer 1 corresponding to the blue picture element is formed to be smaller than the thickness (cell gap) of the liquid crystal layer 1 corresponding to other picture elements. Thereby, more excellent view angle characteristics can be obtained as compared with the case where the thickness of the liquid crystal layer 1 is the same for each of the picture elements.

In Embodiment 6, the voltage applied to the liquid crystal layer 1 by the electrodes 41 and 42 respectively provided on the pair of substrates is made different for each of the picture elements. This is because, in Embodiment 6, the thickness of the liquid crystal layer 1 of the blue picture element is set smaller than the thickness of the liquid crystal layer 1 of the other picture elements, and thereby the liquid crystal capacitance formed in the blue picture element becomes larger than the liquid crystal capacitance formed in the other picture elements. For this reason, the optimum opposed voltage is made different between the picture elements when a multi gap structure is provided.

In Embodiment 6, the optimum opposed voltage is adjusted between the picture elements by using the channel width of the TFT, and the optimum opposed voltage is further adjusted by adjusting the cell gap between the picture elements. Thereby, it is possible to obtain a liquid crystal display panel in which the variation of the value of α is further suppressed between the picture elements and thereby the image sticking is reduced.

The present application claims priority to Patent Application No. 2010-019562 filed in Japan on Jan. 29, 2010 under the Paris Convention and provisions of national law in a designated State, the entire contents of which are hereby incorporated by reference.

REFERENCE SIGNS LIST

1: Liquid crystal layer
2: Active matrix substrate
3: Color filter substrate
11: Gate bus line (scanning line)
12: Source bus line (signal line)
13: Cs bus line (storage capacitor line)
13a: First Cs bus line
13b: Second Cs bus line
14: TFT (Thin film transistor)
14a: First TFT
14b: Second TFT
15: Pixel electrode
15a: First sub-pixel electrode
15b: Second sub-pixel electrode
21: Channel region
22: Source electrode
23: Drain electrode
23a: Expanded section of drain electrode
24: Contact hole
25: Gate electrode
31: Color filter
31R: Color filter (red)
31G: Color filter (green)
31B: Color filter (blue)
31Y: Color filter (yellow)
41: Pixel electrode
42: Opposed electrode

The invention claimed is:

1. A liquid crystal display device which includes a pair of substrates, and a liquid crystal layer sandwiched between the pair of substrates, and is configured such that a pixel is formed by picture elements of a plurality of colors,
wherein one of the pair of substrates includes scanning lines, signal lines, and storage capacitor lines, a thin film transistor connected to each of the scanning line and the signal line, and a pixel electrode connected to the thin film transistor;
the other of the pair of substrates includes an opposed electrode;
the pixel electrode is arranged for each of the picture elements;
the pixel electrode having a larger area among the plurality of pixel electrodes arranged in one pixel is connected to the thin film transistor having a larger channel width among the plurality of thin film transistors arranged in the one pixel;
the scanning line and the pixel electrode form gate-drain capacitance;
the signal line and the pixel electrode form source-drain capacitance;
the storage capacitor line and the pixel electrode form storage capacitance;
the pixel electrode and the opposed electrode form liquid crystal capacitance;
a ratio of the gate-drain capacitance to a total of the gate-drain capacitance, the source-drain capacitance, the storage capacitance, and the liquid crystal capacitance is different for each of the picture elements of the plurality of colors; and
a difference between a largest ratio of the gate-drain capacitance and a smallest ratio of the gate-drain capacitance, among the ratios of the gate-drain capacitance respectively obtained for the picture elements of the plurality of colors, is 10% or less of the smallest ratio of the gate-drain capacitance.

2. The liquid crystal display device according to claim 1, wherein an overlapping area of the scanning line and the pixel electrode having a larger area is different from an overlapping area of the scanning line and the pixel electrode having a smaller area.

3. The liquid crystal display device according to claim 1, wherein an overlapping area of the signal line and the pixel electrode having a larger area is different from an overlapping area of the signal line and the pixel electrode having a smaller area.

4. The liquid crystal display device according to claim 1, wherein an overlapping area of the storage capacitor line and the pixel electrode having a larger area is different from an overlapping area of the storage capacitor line and the pixel electrode having a smaller area.

5. The liquid crystal display device according to claim 1, wherein a thickness of the liquid crystal layer overlapping the pixel electrode having a larger area is different from a thickness of the liquid crystal layer overlapping the pixel electrode having a smaller area.

6. The liquid crystal display device according to claim 1, wherein a value of a response coefficient obtained by calculating, in the one picture element, a ratio of a maximum value of the total of the gate-drain capacitance, the source-drain capacitance, the storage capacitance, and the liquid crystal capacitance, with respect to a minimum value of the total of the gate-drain capacitance, the source-drain capacitance, the storage capacitance, and the liquid crystal capacitance is different for each of the picture elements of the plurality of colors; and
a difference between a largest response coefficient and a smallest response coefficient, among the response coefficients respectively obtained for the picture elements of the plurality of colors, is 5% or less of the smallest response coefficient.

7. The liquid crystal display device according to claim 1, wherein the pixel electrode is configured by a plurality of sub-pixel electrodes divided from each other in one picture element;
the thin film transistors are connected to the sub-pixel electrodes respectively;
the storage capacitor lines overlap the sub-pixel electrodes respectively; and the liquid crystal display device includes a driving circuit which inverts a polarity of a voltage of the storage capacitor line at regular time intervals.

8. The liquid crystal display device according to claim 7, wherein a ratio of the storage capacitance with respect to the total of the gate-drain capacitance, the source-drain capacitance, the storage capacitance, and the liquid crystal capacitance is different for each of the picture elements of the plurality of colors; and a difference between a largest ratio of the storage capacitance and a smallest ratio of the storage capacitance, among the ratios of the storage capacitance respectively obtained for the picture elements of the plurality of colors, is 1.0% or less of the smallest ratio of the storage capacitance.

* * * * *